(12) United States Patent
Griggs et al.

(10) Patent No.: US 7,322,163 B2
(45) Date of Patent: Jan. 29, 2008

(54) CLIPPING PACKAGING APPARATUS AND METHODS

(75) Inventors: Samuel D. Griggs, Raleigh, NC (US); Dennis J. May, Pittsboro, NC (US); W. Mark Poteat, Fuquay-Varina, NC (US); Derek L. Brown, Apex, NC (US)

(73) Assignee: Tipper Tie, Inc., Apex, NC (US)

( * ) Notice: Subject to any disclaimer, the term of this patent is extended or adjusted under 35 U.S.C. 154(b) by 59 days.

(21) Appl. No.: 11/131,002

(22) Filed: May 17, 2005

(65) Prior Publication Data

US 2005/0274088 A1 Dec. 15, 2005

Related U.S. Application Data

(60) Provisional application No. 60/579,708, filed on Jun. 15, 2004.

(51) Int. Cl.
*B65B 51/04* (2006.01)
*B65B 9/10* (2006.01)
*A22C 11/00* (2006.01)

(52) U.S. Cl. .................. 53/138.4; 53/567; 53/417; 452/31

(58) Field of Classification Search .............. 53/528, 53/451, 551, 552, 138.4, 417, 567, 574, 583; 452/30, 31, 37, 38; 29/282, 283.5; 72/330, 72/331
See application file for complete search history.

(56) References Cited

U.S. PATENT DOCUMENTS

| | | | |
|---|---|---|---|
| 2,718,991 A * | 9/1955 | Rabinowitz | 53/526 |
| 2,720,055 A | 10/1955 | Ward | |
| 2,880,419 A | 4/1959 | Tipper | |
| 3,095,308 A * | 6/1963 | Rumsey, Jr. | 426/414 |
| 3,270,481 A * | 9/1966 | Rocholl | 53/417 |
| 3,342,017 A | 9/1967 | Yerkey | |
| 3,358,418 A | 12/1967 | Manetta | |
| 3,383,754 A | 5/1968 | Klenz | |
| 3,389,533 A | 6/1968 | Tipper et al. | |

(Continued)

FOREIGN PATENT DOCUMENTS

| | | |
|---|---|---|
| DE | 2452760 | 5/1976 |
| DE | 2452760 A1 | 5/1976 |
| EP | 0 301 768 | 2/1989 |
| GB | 1 491 444 * | 11/1977 |
| GB | 1491444 | 11/1977 |

(Continued)

OTHER PUBLICATIONS

U.S. Appl. No. 10/969,717, filed Oct. 20, 2004.

(Continued)

*Primary Examiner*—Rinaldi I. Rada
*Assistant Examiner*—Paul Durand
(74) *Attorney, Agent, or Firm*—Myers Bigel Sibley & Sajovec, P.A.

(57) ABSTRACT

An apparatus for enclosing a product in a covering material includes a product feed and covering system, a clipper mechanism and a tensioning system. The product feed and covering system is configured to apply the covering material over the product. The clipper mechanism is disposed downstream of the product feed and covering system along a flow path of the covering material. The clipper mechanism is adapted to receive the covering material and to secure a clip to the covering material received therein. The tensioning system is adapted to introduce a tensioning load to the covering material after and while the covering material is received in the clipper mechanism.

29 Claims, 27 Drawing Sheets

U.S. PATENT DOCUMENTS

| | | | |
|---|---|---|---|
| 3,400,433 A | 9/1968 | Klenz | |
| 3,499,259 A | 3/1970 | Tipper et al. | |
| 3,543,378 A | 12/1970 | Klenz | |
| 3,587,204 A | 6/1971 | George | |
| 3,662,514 A | 5/1972 | Goss | |
| 3,719,022 A | 3/1973 | Cherio | |
| 3,732,662 A | 5/1973 | Paxton | |
| 3,797,199 A | 3/1974 | Seifert | |
| 3,815,323 A | 6/1974 | Longo | |
| 3,945,171 A | 3/1976 | arietta et al. | |
| D243,158 S | 1/1977 | Bolwell | |
| 4,044,450 A | 8/1977 | Raudys et al. | |
| 4,091,595 A | 5/1978 | Pelster et al. | |
| 4,165,593 A | 8/1979 | Niedecker | |
| 4,223,508 A * | 9/1980 | Wells | 53/138.4 |
| 4,247,005 A | 1/1981 | Buxton | |
| 4,430,772 A | 2/1984 | Michel et al. | |
| 4,438,545 A * | 3/1984 | Kupcikevicius et al. | 452/32 |
| 4,505,003 A | 3/1985 | Becker et al. | |
| 4,525,898 A | 7/1985 | Gallion et al. | 24/30.5 W |
| 4,537,006 A | 8/1985 | Pieri | |
| 4,590,748 A | 5/1986 | Harrison et al. | |
| 4,642,865 A * | 2/1987 | Kelem | 29/243.56 |
| 4,651,498 A | 3/1987 | Piereder | |
| 4,675,945 A | 6/1987 | Evans et al. | 452/48 |
| 4,683,700 A | 8/1987 | Evans et al. | |
| 4,766,713 A | 8/1988 | Evans | |
| 4,847,953 A | 7/1989 | Evans et al. | 452/36 |
| 4,944,172 A | 7/1990 | Evans | 72/53 |
| 4,969,233 A | 11/1990 | Stanley | |
| 4,980,949 A * | 1/1991 | Stanley | 452/37 |
| 5,016,424 A | 5/1991 | Stirling | |
| 5,017,175 A | 5/1991 | Klusmire | |
| 5,024,041 A | 6/1991 | Urban et al. | 53/449 |
| 5,042,234 A | 8/1991 | Evans et al. | |
| 5,044,144 A | 9/1991 | Foote et al. | |
| 5,067,313 A | 11/1991 | Evans | |
| 5,074,386 A | 12/1991 | Evans | 188/67 |
| 5,085,036 A | 2/1992 | Evans et al. | 53/550 |
| 5,107,666 A | 4/1992 | Rahtican | |
| 5,109,648 A | 5/1992 | Evans | |
| 5,135,770 A | 8/1992 | Underwood | 426/271 |
| 5,161,347 A | 11/1992 | May et al. | |
| 5,165,216 A | 11/1992 | May et al. | |
| 5,167,567 A | 12/1992 | Evans | 452/37 |
| 5,181,302 A | 1/1993 | Evans | 29/243.56 |
| 5,203,760 A | 4/1993 | Chen et al. | 493/302 |
| D340,467 S | 10/1993 | Pollak | |
| 5,402,625 A | 4/1995 | Halstead | |
| 5,421,142 A | 6/1995 | Cullen | |
| 5,426,910 A | 6/1995 | Cullen | |
| 5,476,673 A | 12/1995 | Sombrio | |
| 5,495,701 A | 3/1996 | Poteat et al. | |
| 5,570,561 A | 11/1996 | May et al. | |
| 5,586,424 A | 12/1996 | Chen et al. | |
| 5,715,656 A | 2/1998 | Pearce | |
| 5,884,346 A | 3/1999 | Hengl | |
| 6,052,972 A | 4/2000 | Rea et al. | |
| 6,131,367 A | 10/2000 | Fukuda et al. | |
| 6,219,998 B1 * | 4/2001 | Demming et al. | 53/459 |
| 6,401,885 B1 | 6/2002 | Whittlesey | 188/322.16 |
| 6,524,178 B1 * | 2/2003 | Fassler et al. | 452/37 |
| 6,604,338 B1 | 8/2003 | May et al. | 53/138.2 |
| 6,637,075 B1 | 10/2003 | Gorman et al. | 24/30.5 W |
| 6,694,711 B1 | 2/2004 | Cullen | |
| 6,695,364 B2 | 2/2004 | Bierlin | 292/307 |
| 6,708,742 B2 | 3/2004 | Weathers et al. | |
| 6,719,194 B2 | 4/2004 | Richards | |
| 6,729,102 B2 | 5/2004 | Ailey et al. | |
| 6,745,547 B2 | 6/2004 | Bussey et al. | |
| 6,883,297 B2 | 4/2005 | Kirk et al. | |
| 6,945,171 B1 | 9/2005 | Coull | |
| 6,976,346 B2 | 12/2005 | May et al. | |
| 2003/0131564 A1 | 7/2003 | Ailey et al. | |
| 2004/0250512 A1 | 12/2004 | May | |
| 2005/0053699 A1 | 3/2005 | Whittlesey | |
| 2005/0072119 A1 | 4/2005 | Griggs et al. | |
| 2005/0087075 A1 | 4/2005 | Mysker | |
| 2005/0101240 A1 | 5/2005 | Mysker | |
| 2005/0229541 A1 | 10/2005 | Griggs | |
| 2005/0235608 A1 | 10/2005 | Griggs et al. | |
| 2005/0247026 A1 | 11/2005 | Griggs | |
| 2005/0284108 A1 | 12/2005 | Griggs | |

FOREIGN PATENT DOCUMENTS

| | | |
|---|---|---|
| GB | 1491444 A | 11/1977 |
| GB | 1564397 | 4/1980 |
| GB | 1564397 A | 4/1980 |
| JP | 2002-019735 | 1/2002 |
| WO | WO 00/20282 | 4/2000 |
| WO | WO 2004/007298 | 1/2004 |
| WO | WO 2004/007298 A2 | 1/2004 |
| WO | WO 2005/044020 | 5/2005 |

OTHER PUBLICATIONS

U.S. Appl. No. 11/256,809, filed Oct. 24, 2005, Gupton.
U.S. Appl. No. 11/262,600, filed Oct. 31, 2005, Wince.
Abstract Only in English.
International Search Report and Invitation to Pay Additional Fees for PCT application No. PCT/US2005/020019 dated Oct. 28, 2005.
International Search Report and Written Opinion of the International Searching Authority for PCT application PCT/US2005/020006 dated Oct. 25, 2005.
Rigidized Metals Corporation, Corporate Profile, 1 page, <http://www.rigidized.com> accessed on Sep. 23, 2005, but for the purposes of examination, the reference is deemed to be before the priority filing date of the instant application.
www.mcmaster.com, Compressed Air Flow Control Valves, 1 sheet, Date unknown but believed to be before Oct. 2004.
www.tippertie.com/smoked/tcm2250.asp, 2 sheets, date believed to be before Nov. 1, 2004.
International Search Report and Written Opinion of the International Searching Authority for International Patent Application No. PCT/US2005/017252 mailed on Sep. 7, 2005.
International Search Report and Written Opinion of the International Searching Authority for PCT application No. PCT/US2005/020019 dated Jan. 16, 2006.
U.S. Appl. No. 10/951,578, Griggs et al.
U.S. Appl. No. 10/952,421, Griggs et al.
U.S. Appl. No. 60/579,709, Poteat et al.
Product Brochure, 6 sheets, "Tipper Net For Smoking, Hanging & Decoration, Net-All® Netting Is The Answer," © 2000.
Product Brochure, 1 sheet, "Tipper Clipper®-Signature Series SZ3214 Double Clipper for Netting," © 2002.
Product Brochure, 2 sheets, "Tipper Net Z3200 Double Clipper and Plant Netting System," © 2000.
Product Brochure, 1 sheet, "Tipper Tie-Net, Safely and quickly package plugs before shipping," © 1999.
Product Brochure, 1 sheet "Tipper Netter TN-3000 Automatic Netting-Packaging Machine," © 2002.
Product Brochure, 4 sheets, "Net-All® Netting is The answer to All Your Horticultural Applications," © 2001.
Product Brochure, 2 sheets, "Net-All Sleeved Plastic Netting System," © 2000.
Written Opinion of the International Searching Authority for PCT Application No. PCT/US2005/17252 mailed Jan. 4, 2007.
Notification of Transmittal of the International Search Report and the Written Opinion of the International Searching Authority, or the Declaration, PCT/US2005/017252, mailed Sep. 7, 2005.

* cited by examiner

US 7,322,163 B2

CLIPPING PACKAGING APPARATUS AND METHODS

RELATED APPLICATION

This application claims the benefit of priority to U.S. Provisional Patent Application No. 60/579,708, filed Jun. 15, 2004, the contents of which are hereby incorporated by reference as if recited in full herein.

FIELD OF THE INVENTION

The present invention relates to packaging apparatus and, more particularly, to packaging apparatus that apply closure clips to materials, such as netting material, that enclose products therein.

BACKGROUND OF THE INVENTION

Certain types of commodity and/or industrial items can be packaged by placing the desired product(s) in a covering material and then applying a closure clip or clips to end portions of the covering material to secure the product(s) therein. For non-flowable piece goods, the piece goods can be held individually in a respective clipped package, or as a group of goods in a single package. The covering material can be any suitable material, typically a casing and/or netting material.

Generally described, when packaging a piece good product in netting, the product is manually pushed through a netting chute. The product can include, by way of example, a non-flowable semi-solid and/or solid object such as a meat product including whole or half hams, turkey, chicken, and the like. The netting chute holds a length of a netting sleeve over the exterior thereof. A first downstream end portion of the netting is typically closed using a first clip. As the product exits the netting chute, it is covered with the netting. An operator can then orient the product inside the netting between the discharge end of the chute and the clipped first end portion of the netting. The operator can then pull the netting so that the netting is held relatively tight (typically stretched or in tension) over the product. The operator then uses his/her hands to compress or gather the open end of the netting (upstream of the product) and manually applies a clip to the netting, typically using a Tipper Tie® double clipper apparatus. A clip attachment apparatus or "clippers" are well known to those of skill in the art and include those available from Tipper Tie, Inc., of Apex, N.C., including product numbers Z3214, Z3202, and Z3200. Examples of clip attachment apparatus and/or packaging apparatus are described in U.S. Pat. Nos. 3,389,533; 3,499,259; 4,683,700; and 5,161,347, the contents of which are hereby incorporated by reference as if recited in full herein.

The double clipper concurrently applies two clips to the netting proximate the open (upstream) end of the package. One clip defines the first end portion of the next package and the other defines the trailing or second end portion of the package then being closed. A cutting mechanism incorporated in the clipper apparatus can sever the two packages before the enclosed package is removed from the clipper apparatus. U.S. Pat. No. 4,766,713 describes a double clipper apparatus used to apply two clips to a casing covering. U.S. Pat. No. 5,495,701 proposes a clipper with a clip attachment mechanism configured to selectively fasten a single clip or two clips simultaneously. The mechanism has two punches, one of which is driven directly by a pneumatic cylinder and the other of which is connected to the first punch using a pin and key assembly. The pin and key assembly allows the punches to be coupled or decoupled to the pneumatic cylinder drive to apply one single clip or two clips simultaneously. U.S. Pat. No. 5,586,424 proposes an apparatus for movement of U-shaped clips along a rail. The apparatus includes a clip feed for advancing clips on a guide rail and the arm is reciprocally driven by a piston and cylinder arrangement. The contents of each of these patents are hereby incorporated by reference as if recited in full herein.

Other devices provide for semi-automated or automated clipping as described in U.S. Pat. No. 6,729,102 and co-assigned, co-pending U.S. Provisional Patent Application Ser. No. 60/508,659, the contents of which are hereby incorporated by reference as if recited in full herein. U.S. Pat. No. 6,729,102 describes a device with a chute that is configured to package a product, such as a vacuum-packed turkey, and can also form a handle in a tubular covering encasing the product.

SUMMARY OF EMBODIMENTS OF THE INVENTION

Embodiments of the present invention provide apparatus, subassemblies and/or other devices, systems and methods for packaging a product in a covering material and/or applying clips thereto.

In certain embodiments, the product can be manipulated and packaged so that at least one clip is automatically (e.g., semi-automatically or fully automatically) applied to enclose the product in the covering material. Particular embodiments automatically package a discrete object or objects in netting.

According to embodiments of the present invention, an apparatus for enclosing a product in a covering material includes a product feed and covering system, a clipper mechanism and a tensioning system. The product feed and covering system is configured to apply the covering material over the product. The clipper mechanism is disposed downstream of the product feed and covering system along a flow path of the covering material. The clipper mechanism is adapted to receive the covering material and to secure a clip to the covering material received therein. The tensioning system is adapted to introduce a tensioning load to the covering material after and while the covering material is received in the clipper mechanism.

According to further embodiments of the present invention, a tensioning system for use with a product feed and covering system and a clipper mechanism for enclosing a product in a covering material is adapted to introduce a tensioning load to a covering material after and while the covering material is received in the clipper mechanism.

According to method embodiments of the present invention, a method for enclosing a product in a covering material includes: applying the covering material over the product; thereafter directing the product and the covering material along a flow path; receiving the covering material in a clipper mechanism; thereafter introducing a tensioning load to the covering material while the covering material is received in the clipper mechanism; and securing a clip to the covering material using the clipper mechanism.

According to further embodiments of the present invention, an apparatus for enclosing a product in a covering material includes a product feed and covering system, a clipper mechanism, and a tensioning system. The product feed and covering system is configured to apply the covering material over the product. The clipper mechanism is disposed downstream of the product feed and covering system along a flow path of the covering material. The clipper mechanism is adapted to receive the covering material and to secure a clip to the covering material. The tensioning system is adapted to draw a portion of the covering material along the flow path through the clipper mechanism while the covering material is received in the clipper mechanism.

According to further method embodiments, a method for enclosing a product in a covering material includes: applying the covering material over the product; thereafter directing the product and the covering material along a flow path; receiving the covering material in a clipper mechanism; drawing a portion of the covering material along the flow path while the covering material is received in the clipper mechanism; and thereafter, securing a clip to the covering material using the clipper mechanism.

According to further embodiments of the present invention, an apparatus for enclosing a product in a covering material includes a force actuator, a tensioner attachment, and a handle maker attachment. The tensioner attachment and the handle maker attachment are adapted to be interchangeably coupled to the force actuator. When the tensioner attachment is mounted on the force actuator, the force actuator is operable to force the tensioner attachment into engagement with the covering material to introduce a tensioning load to the covering material. When the handle maker attachment is mounted on the force actuator, the force actuator is operable to move the handle maker to form a handle loop in the covering material.

These and other objects and/or aspects of the present invention are explained in detail in the specification set forth below.

DESCRIPTION OF EMBODIMENTS OF THE INVENTION

Figure 1:
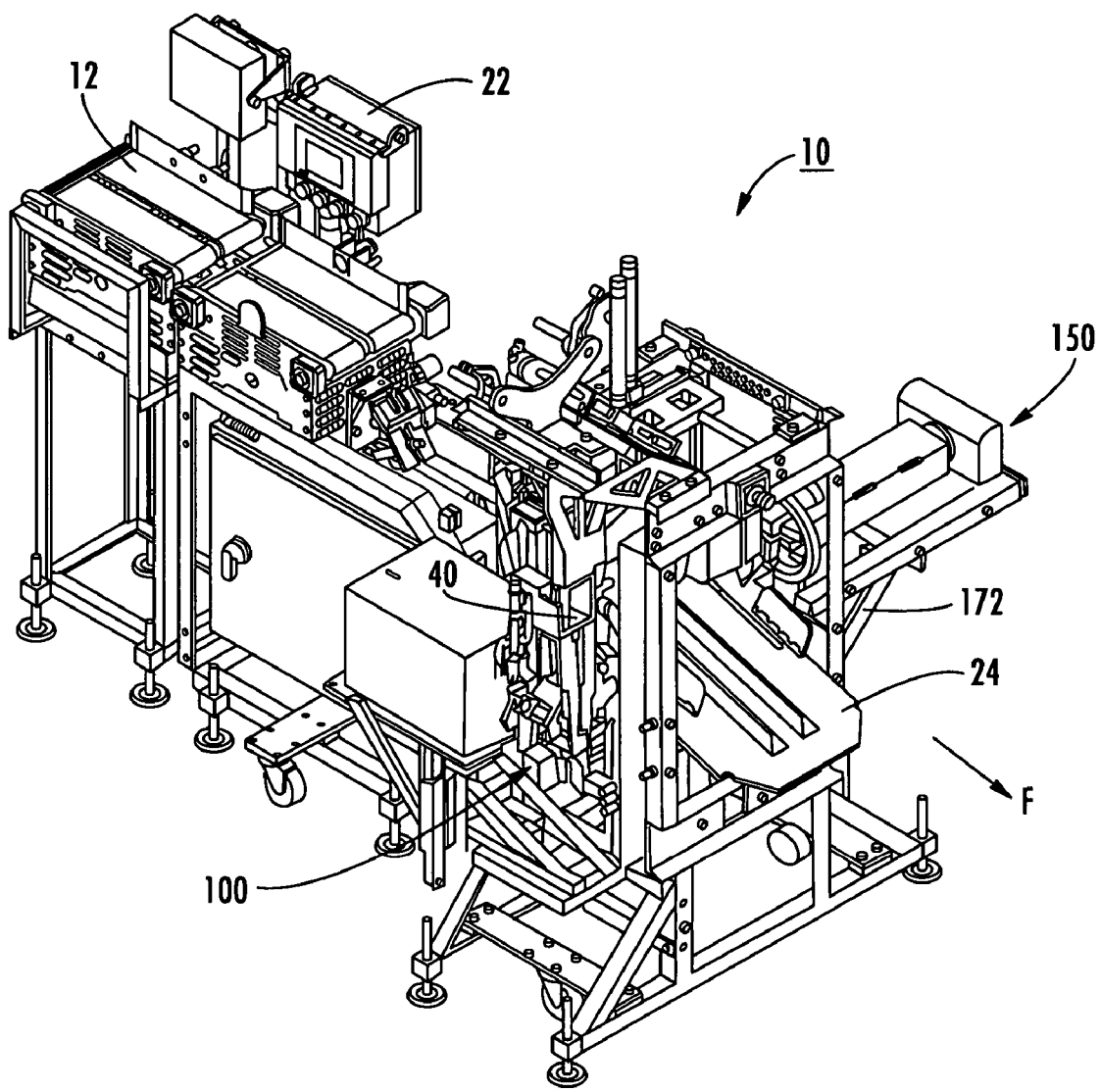
FIG. 1 is a perspective view of an apparatus according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations, unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

In the description of the present invention that follows, certain terms are employed to refer to the positional relationship of certain structures relative to other structures. As used herein, the terms "front," "forward" and derivatives thereof refer to the general or primary direction that a target product travels for enclosure and/or clipping; this term is intended to be synonymous with the term "downstream," which is often used in manufacturing or material flow environments to indicate that certain material traveling or being acted upon is farther along in that process than other material. Conversely, the terms "rearward," "upstream" and derivatives thereof refer to the directions opposite, respectively, the forward and downstream directions.

The term "frame" means a generally skeletal structure used to support one or more assemblies, modules and/or components. The term "modular" means that a subassembly is designed with standardized dimensions, mounting features and/or configurations for interchangeable use with replacement modules of the same or similar type and/or other selected different modules. The frame and selected modules may also be configured for selectable mounting on a right or left hand side of a common frame.

"Automatic", "automatically" and the like as used herein may include fully automatic as well as semi-automatic operation.

As used herein, "flow path" refers to a path of travel or movement and does not require a fluid flow or the like.

The present invention is particularly suitable for applying closure clips to discrete objects held in a covering material. The covering material may be natural or synthetic and may be a casing material that can be sealed about a product or may be netting. The casing can be any suitable casing (edible or inedible, natural or synthetic) such as, but not limited to, collagen, cellulose, plastic, elastomeric or polymeric casing. In certain embodiments, the casing comprises netting. The term "netting" refers to any open mesh material in any form including, for example, knotted, braided, extruded, stamped, knitted, woven or otherwise. Typically, the netting is configured so as to be stretchable in both axial and lateral directions.

Netting or other covering material may be used to package discrete meat products such as loaves of meat, boned ham, spiral sliced ham, deboned ham, turkey, turkey loaves held in molds, or other meat or items directly or with the items held in subcontainers and/or wraps such as molds, trays, boxes, bags, absorbent or protective sheets, sealant, cans and the like. Other embodiments of the present invention may be directed to package other types of food such as cheese, bread, fruit, vegetables, and the like, as well as non-food items. Examples of non-food items that may be packaged using embodiments of the present invention include living items such as flora, trees, and the like, as well as inanimate objects. Additional examples of products include discrete, semi-solid or solid objects such as firewood, pet food (typically held in a container if the wet type), recreational objects (such as balls), or other solid or semi-solid objects. The product may be packaged for any suitable industry including horticulture, aquaculture, agriculture, or other food industry, environmental, chemical, explosive, or other application. Netting may be particularly useful to package ham or turkeys, manufactured hardware such as automotive parts, firewood, explosives, molded products, and other industrial, consumable, and/or commodity item(s).

Generally stated, embodiments of the present invention are directed at the packaging of piece goods or discrete items by wrapping or enveloping the objects in a covering material, such as netting, then automatically or semi-automatically clipping the covering material with a closure clip or other attachment means to close the covering and hold the object or objects inside of the covering material. As noted above, clippers are available from Tipper Tie, Inc., of Apex, N.C. Examples of suitable clips include metallic generally "U"-shaped clips available from Tipper Tie, Inc., in Apex, N.C. Other clips, clip materials and clip configurations or closure means may also be used.

Figure 28:
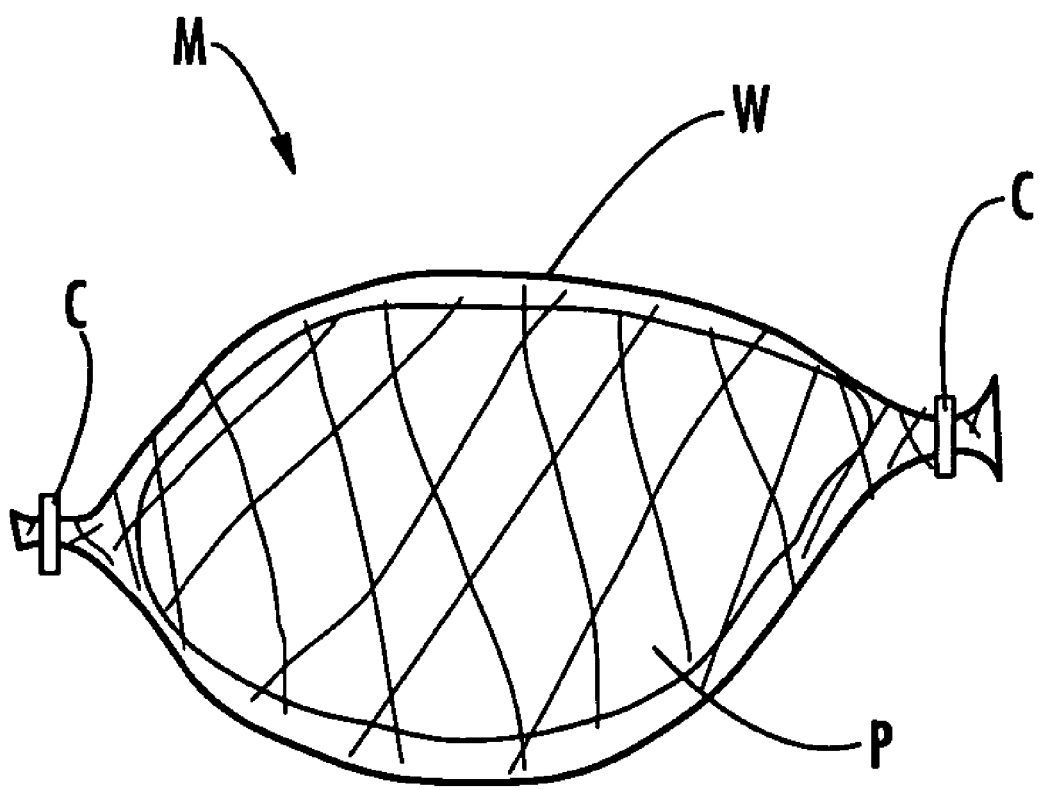
FIG. 28 is an exemplary packaged product assembly of the type which may be formed in accordance with the apparatus and methods according to embodiments of the present invention.

Methods and apparatus in accordance with the present invention may be used to form packaged product assemblies as discussed above. An exemplary packaged product assembly M is shown in FIG. 28. The packaged product assembly M includes a product P that is enveloped by a cover W, such as netting, as discussed above. The product P may also be covered with additional material (e.g., a vacuum pack film) between the product P and the cover W. The cover W is generally tubular. The opposed open ends of the cover W are secured or sealed in a closed condition by respective clips C.

FIGS. 1-6 illustrate an exemplary clipping packaging apparatus 10 according to embodiments of the present invention, which may be used to form a packaged product assembly or assemblies P as shown in FIG. 28. According to some embodiments, the apparatus 10 may allow for the formation of a tighter fit between the cover W and the product P in the packaged product assembly M. According to some embodiments, the apparatus 10 may allow for more precise control of the volume or tension of the cover W about the product P.

Figure 2:
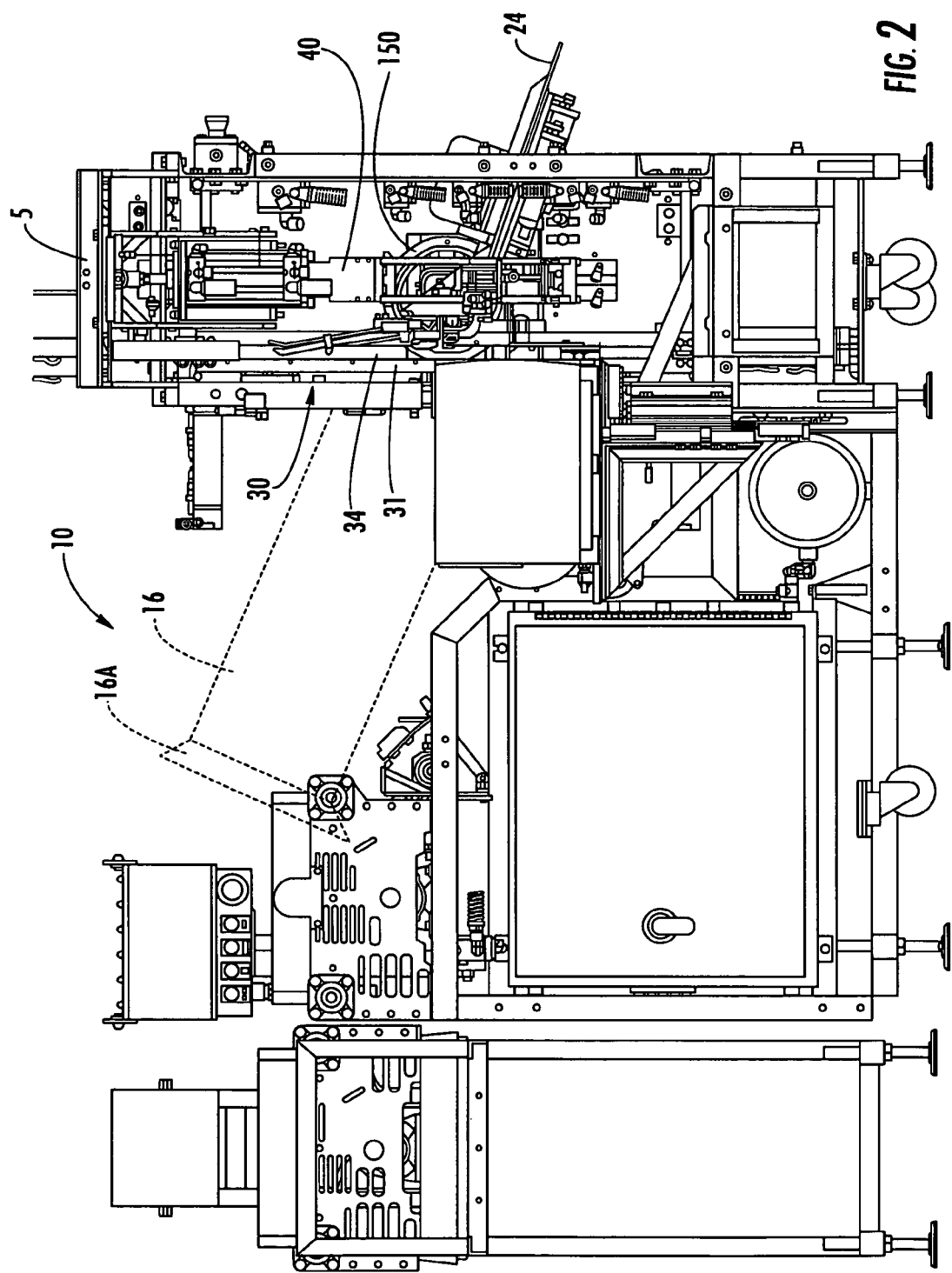
FIG. 2 is a side view of the apparatus of FIG. 1.

As shown in FIG. 2, the apparatus 10 includes a product conveyor 12, a chute 16, a clipper 40, a voiding mechanism 30, a retaining mechanism 100, a tensioning mechanism 150 and a discharge platen, tray or table 24. The chute 16 is shown only in FIGS. 2 and 16-24. It is noted that the clipper 40 may be referred to herein as a clipper apparatus, clipper module, clipper mechanism, and/or clipper assembly, but each term may be used interchangeably with the others. The product chute 16 and the conveyor 12 may serve as a product feed and covering system. According to other embodiments, the product feed and covering system may include a chute or like structure without a conveyor. The product feed and covering system may include other mechanisms and structures. The apparatus 10 as illustrated also includes a human machine interface ("HMI") station 22 that houses operational switches or components that an operator can access to operate the apparatus 10. Housing guards (not shown) may be disposed over certain functional components.

The retaining mechanism 100 may form a part of a retaining system, which may include an associated controller or the like and/or other components that work cooperatively with the retaining mechanism 100 to provide the functionality described herein. The retaining mechanism may take forms other than those shown and described herein.

The tensioning mechanism 150 may form a part of a tensioning system, which may include an associated controller or the like and/or other components that work cooperatively with the tensioning mechanism 150 to provide the functionality described herein. For example, the retaining mechanism 100, a voiding mechanism and/or a covering material brake may also serve as part of a tensioning system. The tensioning mechanism may take forms other than those shown and described herein.

The apparatus 10 may optionally include various other components or mechanisms. For example, the apparatus 10 may further include an infeed conveyor, a handle maker (for example, as disclosed in U.S. Pat. No. 6,729,102 to Ailey et al., the disclosure of which is incorporated herein by reference), and/or a product pusher assembly or mechanism (for example, as disclosed in co-pending, co-assigned U.S. Provisional Patent Application Ser. No. 60/579,846 identified by the disclosure of which is incorporated herein by reference).

In the embodiment shown, the apparatus 10 can be described as a horizontal automatic clipping packaging apparatus as the product is primarily moved, processed, clipped and packaged in a horizontal plane. However, certain components, features or operations may be oriented and/or carried out in other planes or directions and the present invention is not limited thereto. For example, the product chute 16 and/or the conveyor 12 may be configured to incline.

Generally, in the operation of the apparatus 10, the product P is introduced to the chute 16 by the conveyor 12, passes through the chute 16, and is received in the covering material N at the exit end 16B of the chute 16. The product P may be further moved by suitable means to and downstream of the clipper 40. In this manner, a trailing portion of the covering material extending downstream from the portion of the covering material surrounding the product P is pulled from the supply of the covering material N and presented to the clipper 40. The tensioning mechanism 150 introduces or applies a tensioning load to the covering material trailing from the product P and the clipper 40 secures one or more clips C to the covering material N while the tensioning load is applied thereto. The covering material is thereafter cut upstream of at least one of the clips so that the covering material about the product is severed from the remainder of the covering material. During the aforedescribed process, the product P and the covering material generally move along a prescribed flow path in a flow direction F.

According to embodiments of the invention, the tensioning system including the tensioning mechanism 150 introduces a tensioning load that is additional or supplemental to tension (if any) that is already present on the covering material. According to embodiments of the invention, the tensioning load is introduced to the covering material after the covering material is engaged or received by the clipper 40, and is not present prior to that time. According to embodiments of the invention, the tensioning load is maintained on the covering material while the clipper 40 is securing the clip to the covering material. According to embodiments of the invention, the tensioning system is adapted to draw a portion of the covering material along the flow path through the clipper 40.

Turning to the construction and operation of the apparatus 10 in more detail, the conveyor 12 transports the product(s) to the entrance of the chute 16. It is noted that in lieu of and/or with the conveyor 12, other moving floors or product advancement systems may be used (for example, rollers, rolling bars, belts or drives that advance trays or other support members and the like). In addition, the moving floor may be angularly oriented to travel up, down, or otherwise to advance the product to the chute 16. In addition, the apparatus 10 can include an automated continuous advancement system with discrete product(s) separated at desired intervals on the moving floor to serially introduce product for packaging to the chute 16. In certain embodiments, the moving floor can include partitions, channels, or other spacer configurations to hold the product(s) in desired alignment on the moving floor so that, when the proximity sensor indicates the product is present, the partition or channel provides the desired product stop.

The product P is directed through the chute 16 so that the product P is positioned proximate the clipper 40. The arrow F indicates the primary direction of product flow. The product P may be fed to the chute by the conveyor 12. The product P may be conveyed, gravity fed, and/or pushed (e.g., using a pusher assembly) through the chute 16 and to and beyond the clipper 40.

The sleeve of covering material N is positioned about the external surface of the product chute 16 (see FIG. 16) and configured to be drawn downstream thereof so as to automatically encase the product P as the product emerges from the discharge end 16B of the product chute 16. A supplemental sleeve material holder may also be used if desired instead of placing the sleeve of casing material on the product chute. The supplemental sleeve holder can be configured to surround a downstream portion of the product chute 16. The sleeve of covering material may be sized to stretch to substantially conform to the external wall or surface of the product chute 16 or may be more loosely held thereon. The cavity of the product chute 16 may be sized to snugly contact or squeeze opposing portions of the product (side to side and/or top to bottom) as the product is transported therethrough or may be oversized with respect to the product so that the product loosely travels therethrough.

Figure 16:
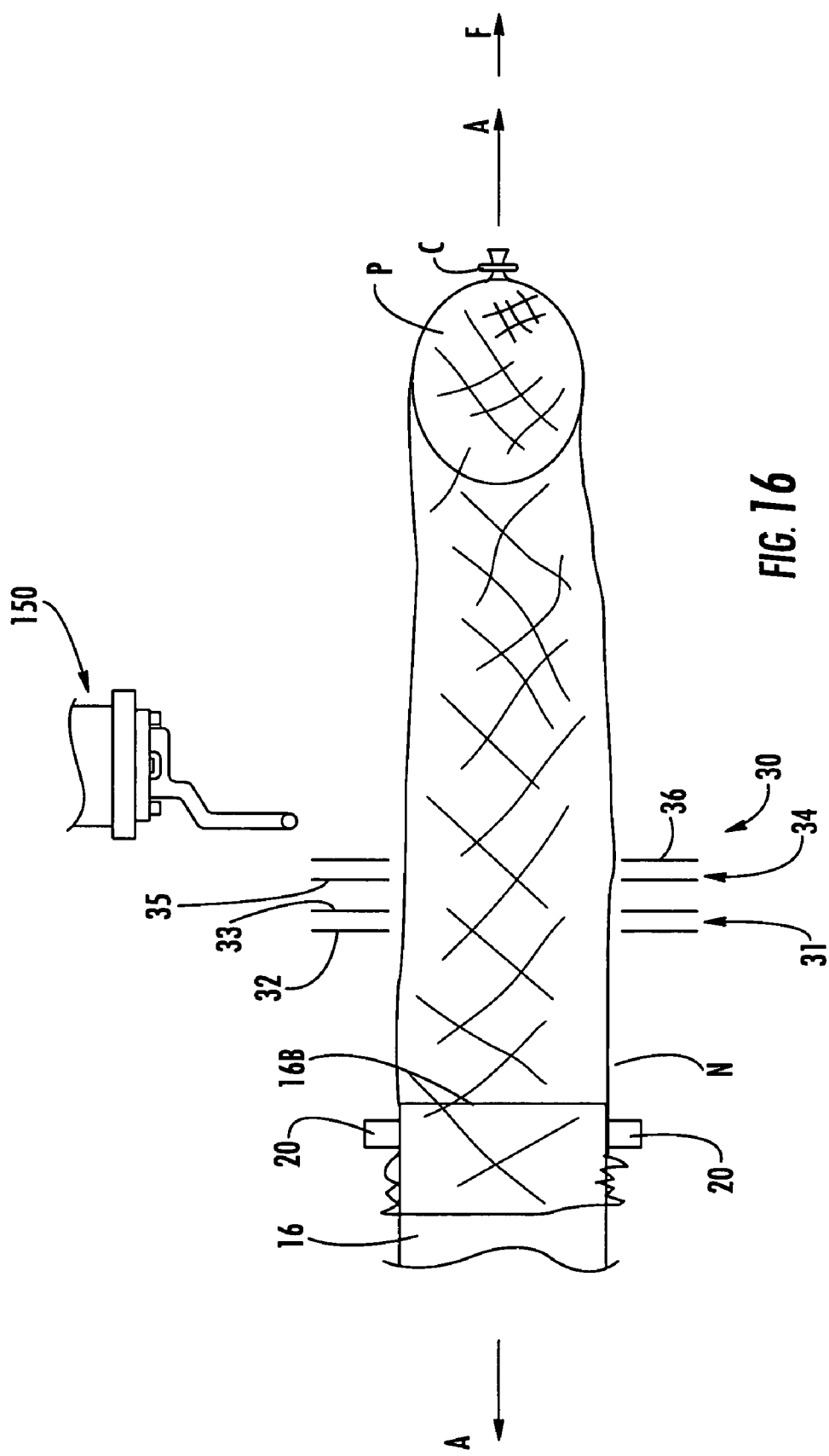
FIGS. 16-22 are schematic views illustrating the operations of selected components of the apparatus of FIG. 1 in accordance with method embodiments of the present invention.

The apparatus 10 can include a brake assembly with brake gripping members 20 (see FIG. 16). The gripping members 20 reside adjacent the sidewalls of the chute 16. The brake assembly can inhibit an excessive quantity of covering material from being pulled off the chute 16 during product insertion into the covering. The brake assembly may be particularly suitable for use with netting covering materials. In addition, the product covering can be held (stretched axially) to be relatively tight and substantially centered about the encased product. The tightness or tension of the covering material may be adjusted by varying the force that the gripper members 20 apply to the chute 16. Where a pneumatic cylinder is used to automatically operate the brakes, the force/tension adjustment can be carried out by adjusting the air pressure delivered to the cylinder. A pressure regulator for this operation may be disposed on the HMI 22 (FIG. 1).

As shown in FIG. 2, the product chute 16 can be an elongate, tubular product chute. The product chute 16 can include a larger front-end cavity area relative to the intermediate and/or discharging portion, i.e., the chute cavity narrows in the product travel direction. The chute 16 may be formed as a unitary member or a series of attached members (not shown).

The product chute floor may be a stationary floor with an anti-stick coating or material. It is also noted that the product chute 16 may include a moving floor such as those types described above with respect to the infeed floor configurations. The chute 16 may be sized relative to the product P so that the product extends across a major portion of the width of the cavity, and in certain embodiments, extends across at least about 75% of the width of the cavity. In certain embodiments, the product and chute cavity are sized so that the sides and/or top and bottom of the product are pressed against the sidewalls of the cavity as the product is pushed therethrough. The product chute 16 may comprise stainless steel and be coated with a friction reducing material such as TEFLON™ polymer. Lubricants may also be disposed on the inner surface(s) of the product chute 16.

In certain embodiments, the product chute 16 has a cross-sectional profile that is non-circular. The product chute 16 may be configured with a planar top and/or bottom portion and semi-circular side portions. Other cross-sectional profile configurations may also be used including, but not limited to, circular, oval, triangular, rectangular, square and the like.

In operation, the sleeve of covering material may be clipped, welded, fused, knotted or otherwise closed and sealed at a leading edge portion thereof. When the product exits the product chute 16, it is held in the covering material as the covering material is drawn downstream. The covering material N may be loaded onto the product chute 16 and the leading edge portion thereof closed before the product chute 16 is mounted to the apparatus 10.

The product P passes from the chute 16 and through the voiding mechanism 30. The voiding mechanism 30 (which may also be referred to as a voider) cooperates with the clipper mechanism 40 and the tensioning mechanism 150 to help gather and "void" the casing or covering material N prior to clipping. The voiding mechanism may take various forms. As shown, the voiding mechanism 30 includes an upstream voider subassembly 31 and a downstream voider subassembly 34 (see FIGS. 2 and 16).

Figure 3:
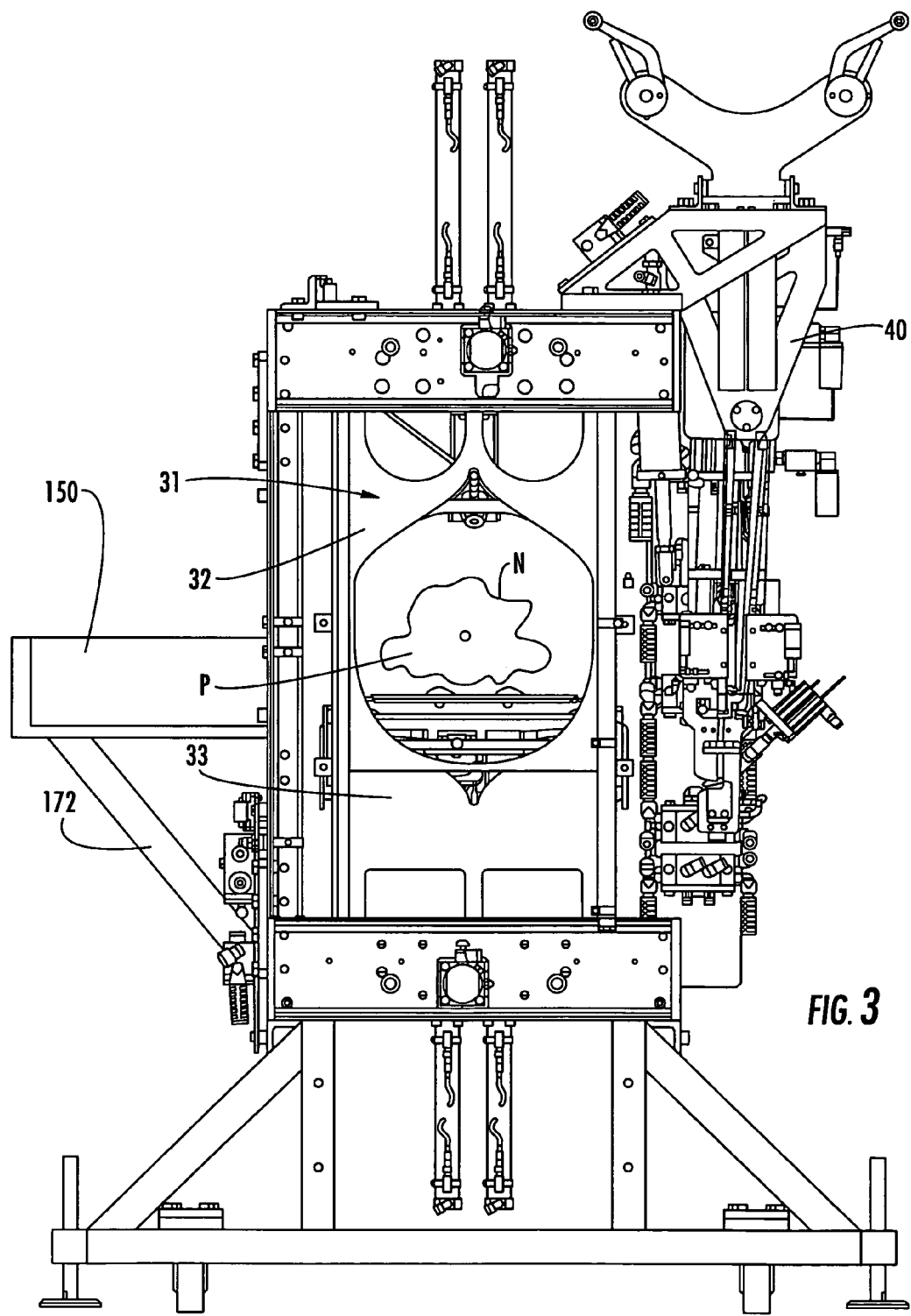
FIG. 3 is a downstream plan view of the apparatus of FIG. 1 wherein voider plates thereof are in an open position and a clipper thereof is in a retracted position.
Figure 4:
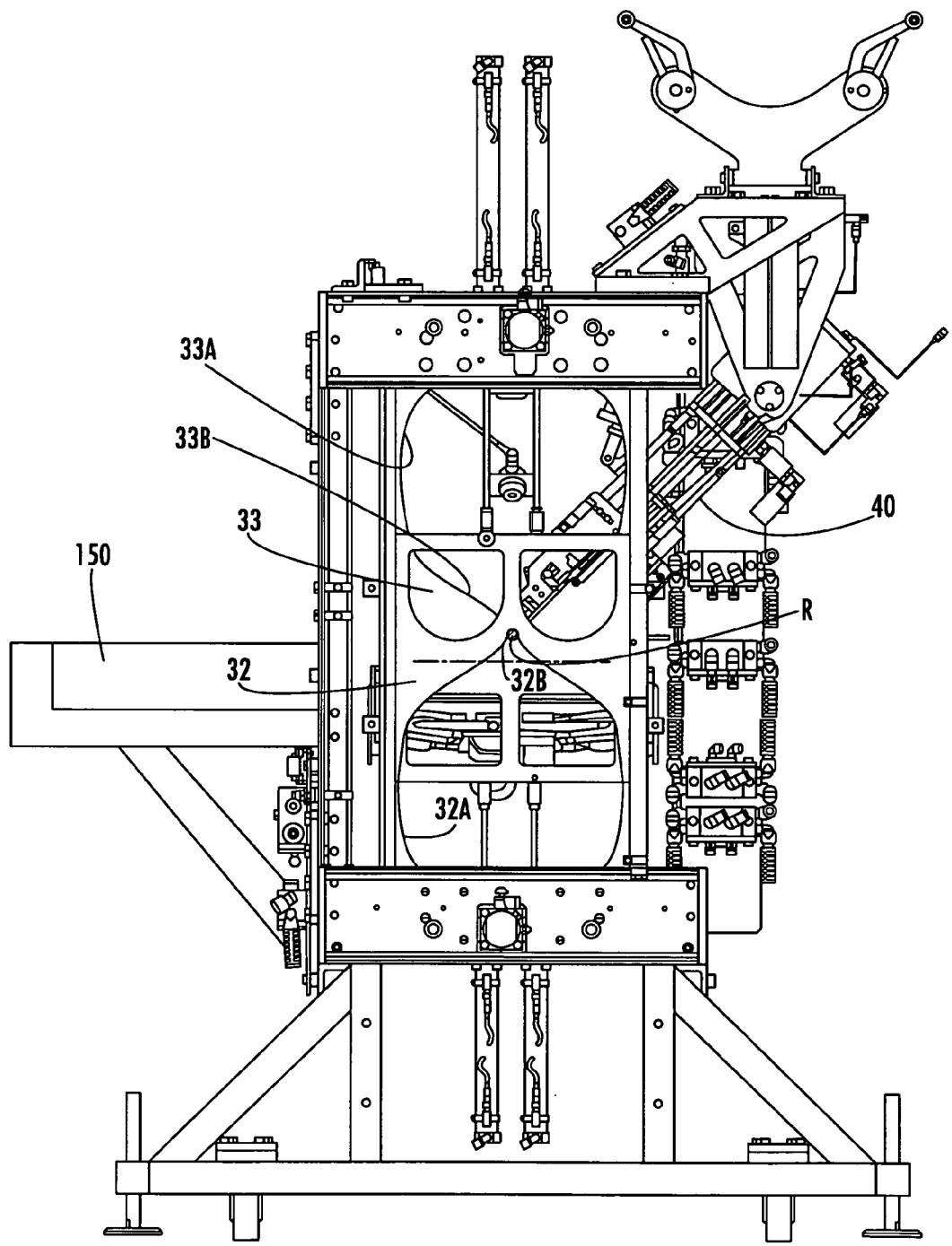
FIG. 4 is a downstream plan view of the apparatus of FIG. 1 wherein the voider plates are in a closed position and the clipper is in a clipping position.

The voider subassembly 31 includes a first voider plate 32 and a second voider plate 33 positioned substantially immediately downstream of and overlapping the first voider plate 32. The voider plates 32, 33 are arranged to be selectively raised and lowered to place the voider subassembly 31 in an "open" position (as shown in FIG. 3) and, alternatively, a "gathered" (or "closed") position (as shown in FIG. 4). More particularly, the voider plate 32 defines an opening 32A and a bite 32B, and the voider plate 33 defines an opening 32A and a bite 33B. In the open position of the voider subassembly 31, the openings 32A, 33A are generally aligned with the flow path P to present a relatively large opening as shown in FIG. 3 through which the covering material N and the product P may pass unimpeded. The voider subassembly 31 may be transitioned to its closed or gathered position as shown in FIG. 4 by lowering the first voider plate 32 and raising the second voider plate 33 so that the bites 32B, 33B converge to gather and radially compress the covering material N therebetween to form a compressed covering material or rope R. The voider subassembly 31 may be transitioned back to the open position by raising the voider plate 32 and lowering the voider plate 33.

The downstream voider subassembly 34 includes a voider plate 35 corresponding to the voider plate 32 and a voider plate 36 corresponding to the voider plate 33. The voider subassembly 34 is of the same construction and operable in the same manner as the voider subassembly 31 to transition between and assume an open position and a gathered (or closed) position.

Figure 18:
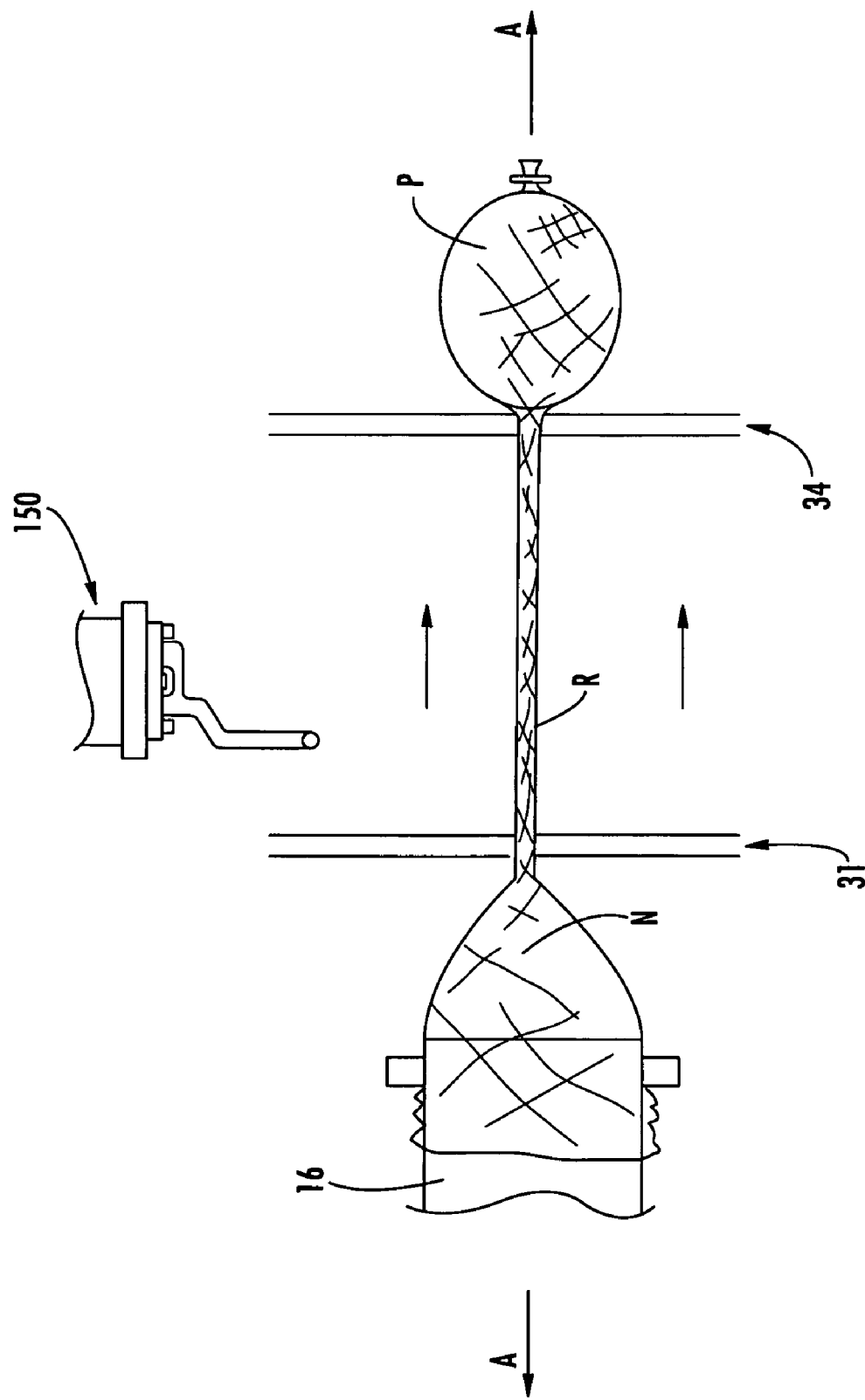

In addition to being openable and closeable, the voider subassemblies are axially movable relative to one another. More particularly, the upstream voider subassembly 31 is typically stationary while the downstream voider subassembly 34 is mounted for translation along the flow axis A-A between a "together" position adjacent the voider subassembly 31 (as shown in FIGS. 2 and 16) and a "shuttled" position separated and spaced downstream from the voider subassembly 31 (as shown in FIG. 18).

Figure 17:
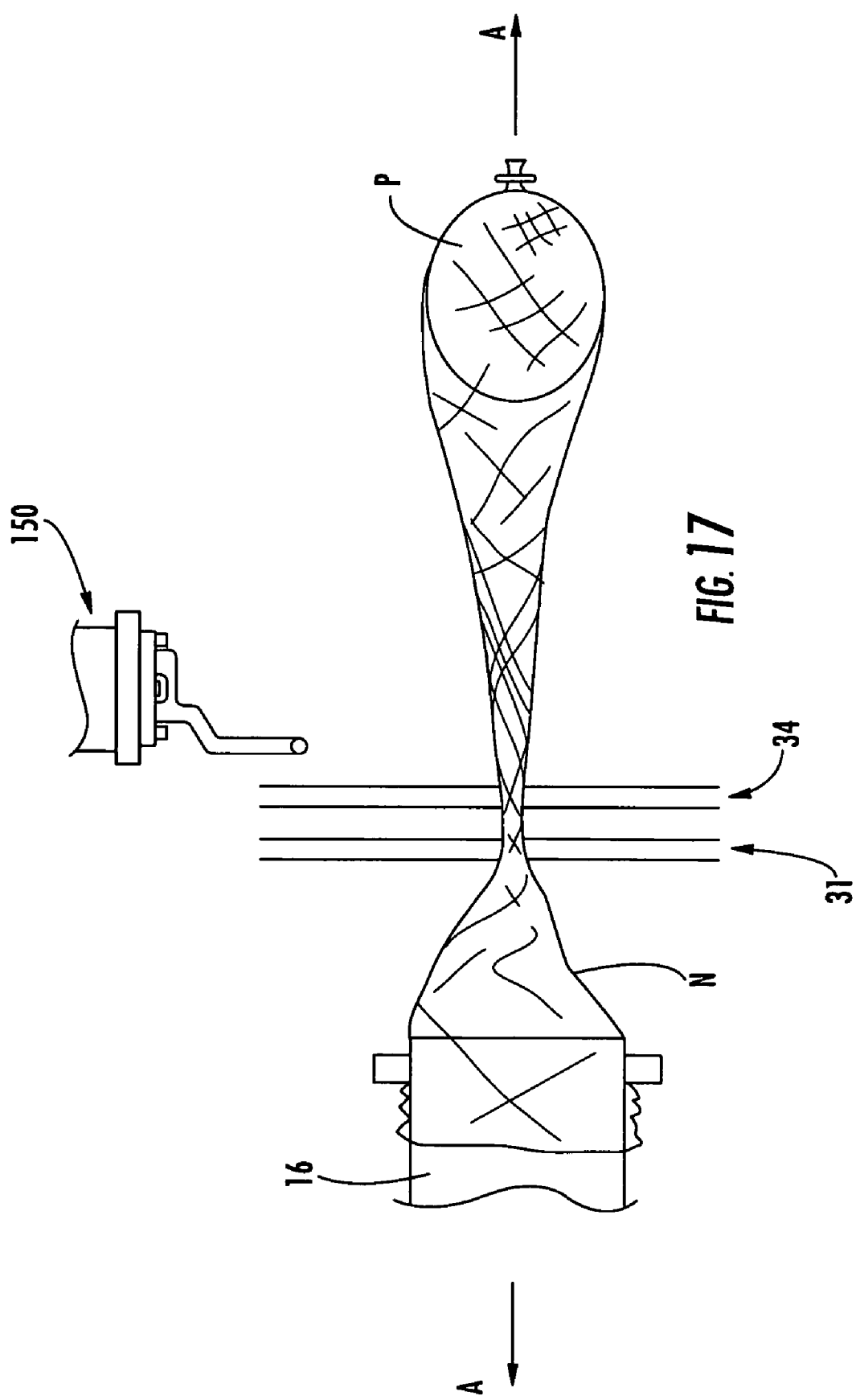

In use, the voider subassemblies 31, 34 are both in the open position and the voider subassembly 34 is in the together position (FIG. 16). After the product passes through the openings 32A, 33A and the corresponding openings of the voider subassembly 34, the voider subassemblies 31, 34 close to gather the rope R therein (FIG. 17). The voider assembly 34 then slides into the shuttled position (FIG. 18). In doing so, the voider assembly 34 forms a section of compressed covering material or rope R extending from the upstream voider assembly 31 to the downstream voider assembly 34. The voider subassembly 34 may also push the product P or remnants thereof downstream.

Figure 5:
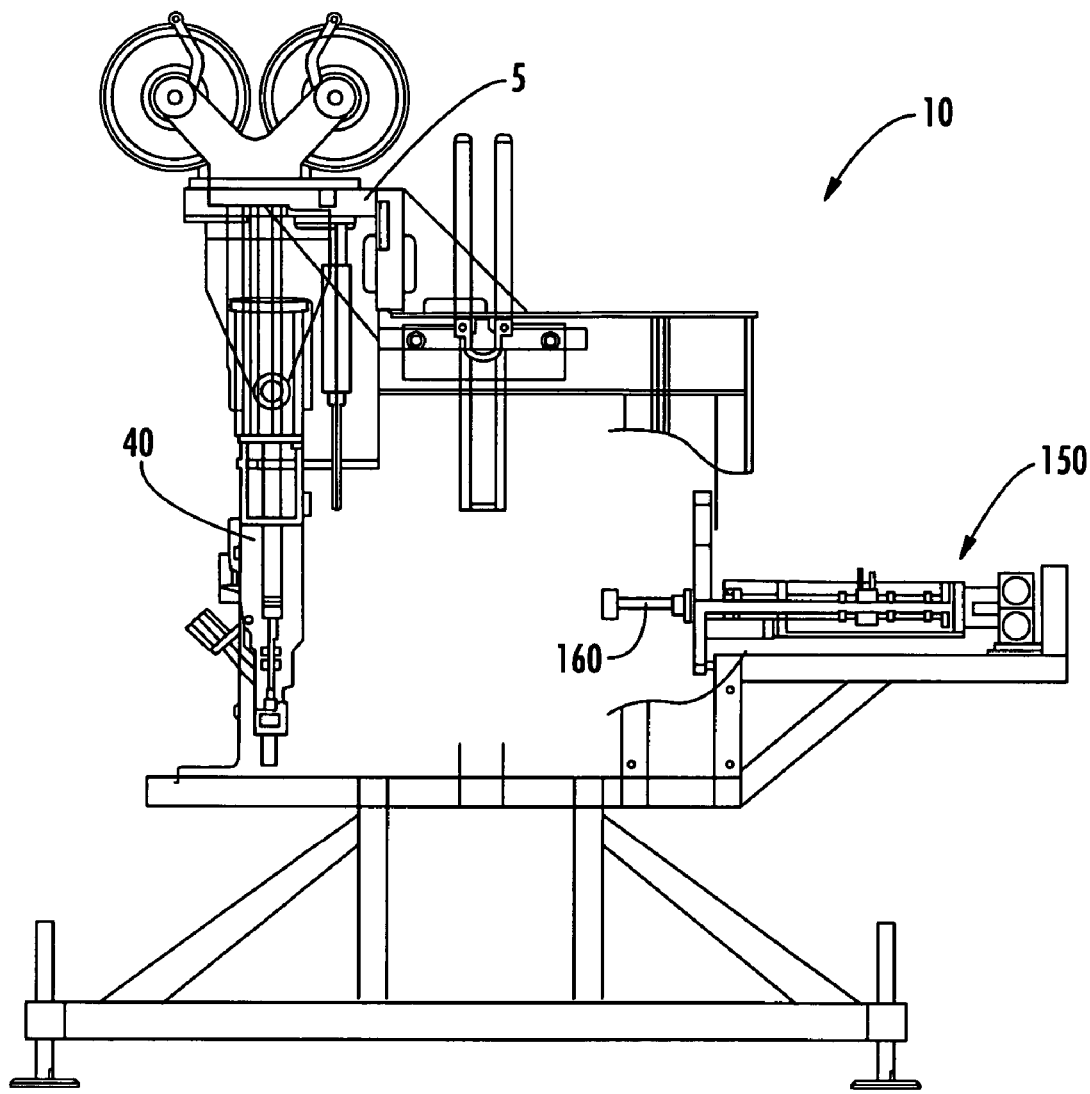
FIG. 5 is a fragmentary, upstream plan view of the apparatus of FIG. 1 wherein the clipper is in the retracted position and a tensioning mechanism of the apparatus is in a retracted position.
Figure 6:
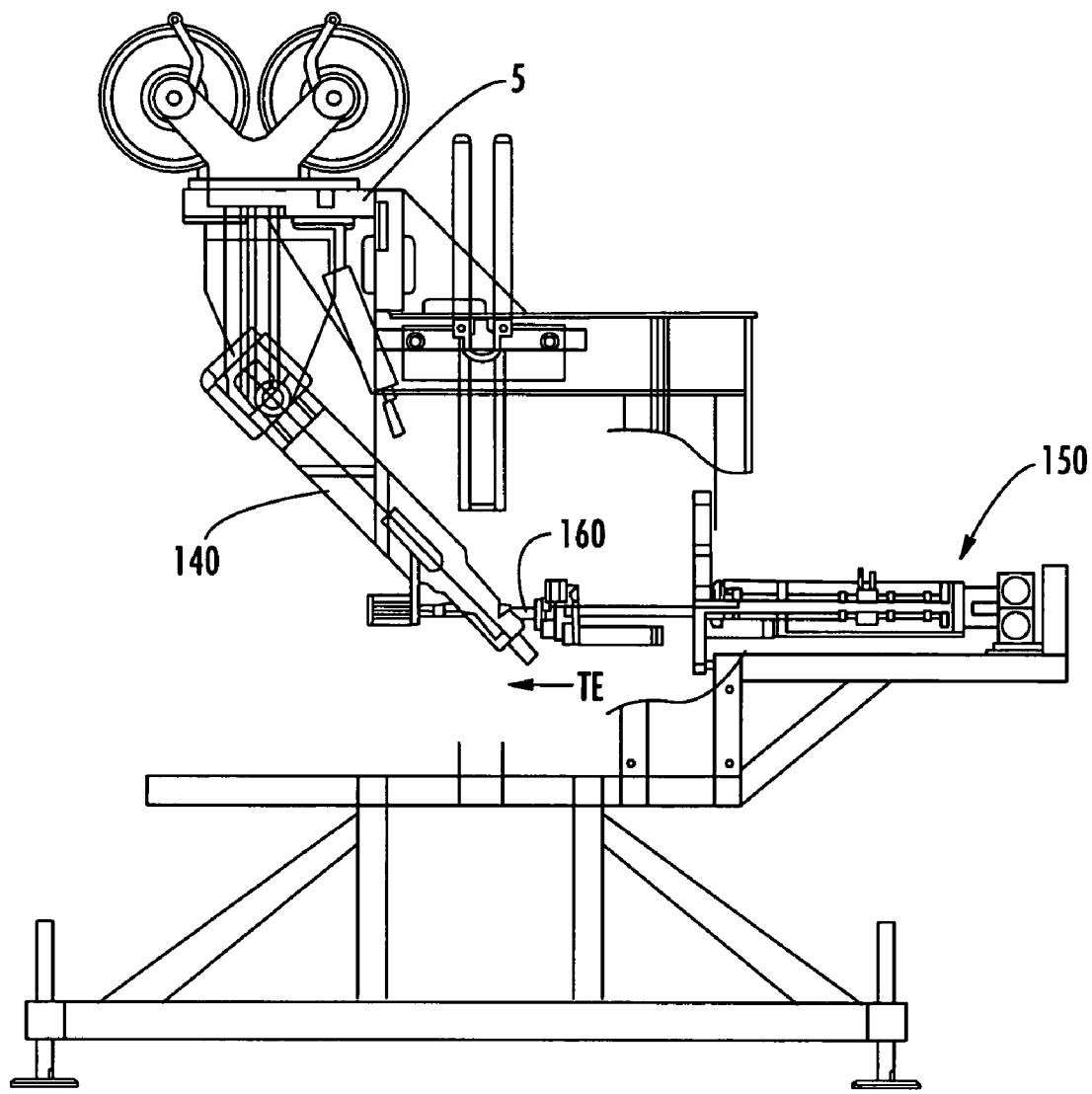
FIG. 6 is a fragmentary, upstream plan view of the apparatus of FIG. 1 wherein the clipper is in the clipping position and the tensioning mechanism is in an extended position.

The clipper 40 may then be transitioned from a home position (generally upright as shown in FIGS. 1, 2, 3 and 5) to a clipping position (as shown in FIGS. 4 and 6). Notably, the voider subassemblies 31, 34 when closed and shuttled provide a positively positioned and sufficiently taut rope R for operative engagement by the clipper 40. After the clips are installed on the rope 40 and the clipper 40 returns to the rest or home position, the voiding mechanism 30 resets by opening each of the voider subassemblies 31, 34 and returning the voider subassembly 34 to the together position.

Figure 19:
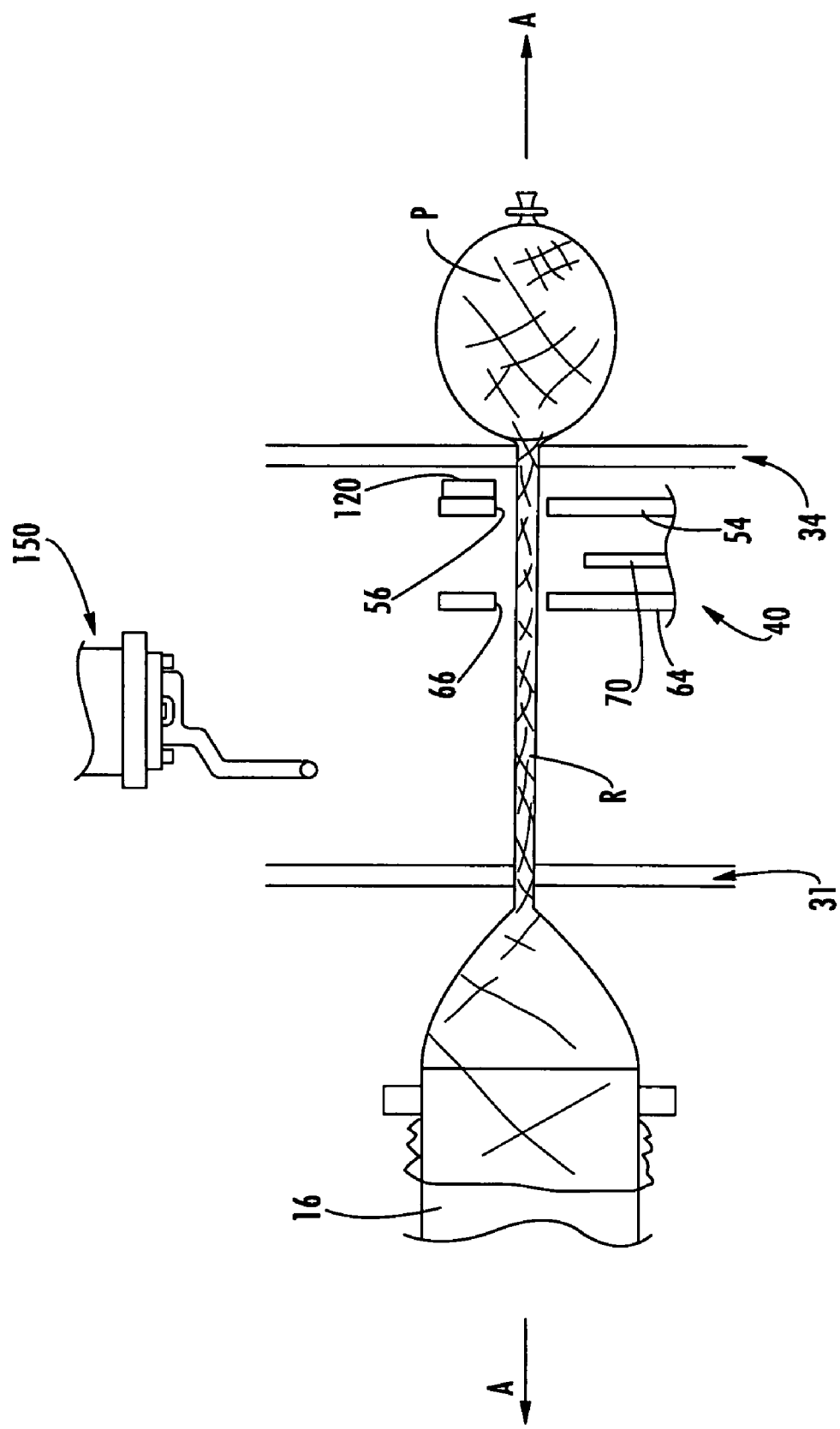

As illustrated in FIGS. 2 and 19, the clipper 40 is positioned downstream of the discharge end portion 16B of the chute 16 and the voider subassembly 31. The clipper 40 is configured to reside in a retracted position (typically generally upright) out of the product travel region to allow the enclosed product P to pass unimpeded until the product rests against a product-holding member such as a tray or table 24 or is otherwise suitably positively positioned.

FIGS. 5-12 illustrate one example of a clipper mechanism 40. The clipper 40 may be particularly suitable for clipping netting but may be used for other materials as well. It will be appreciated that clippers of other designs may be employed in accordance with embodiments of the present invention.

Figure 7:
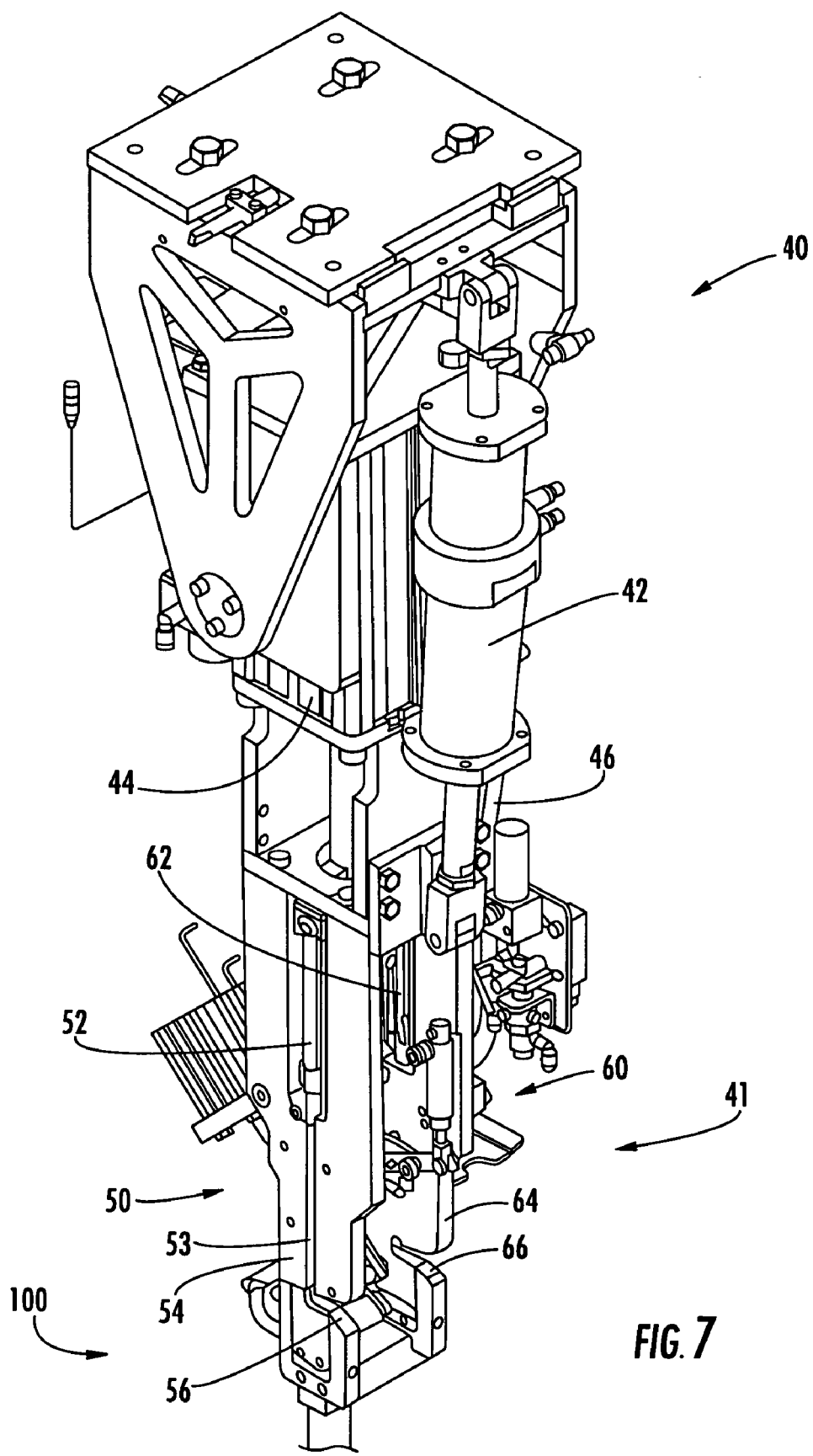
FIG. 7 is a perspective view of the clipper and a retaining mechanism of the apparatus of FIG. 1.
Figure 8:
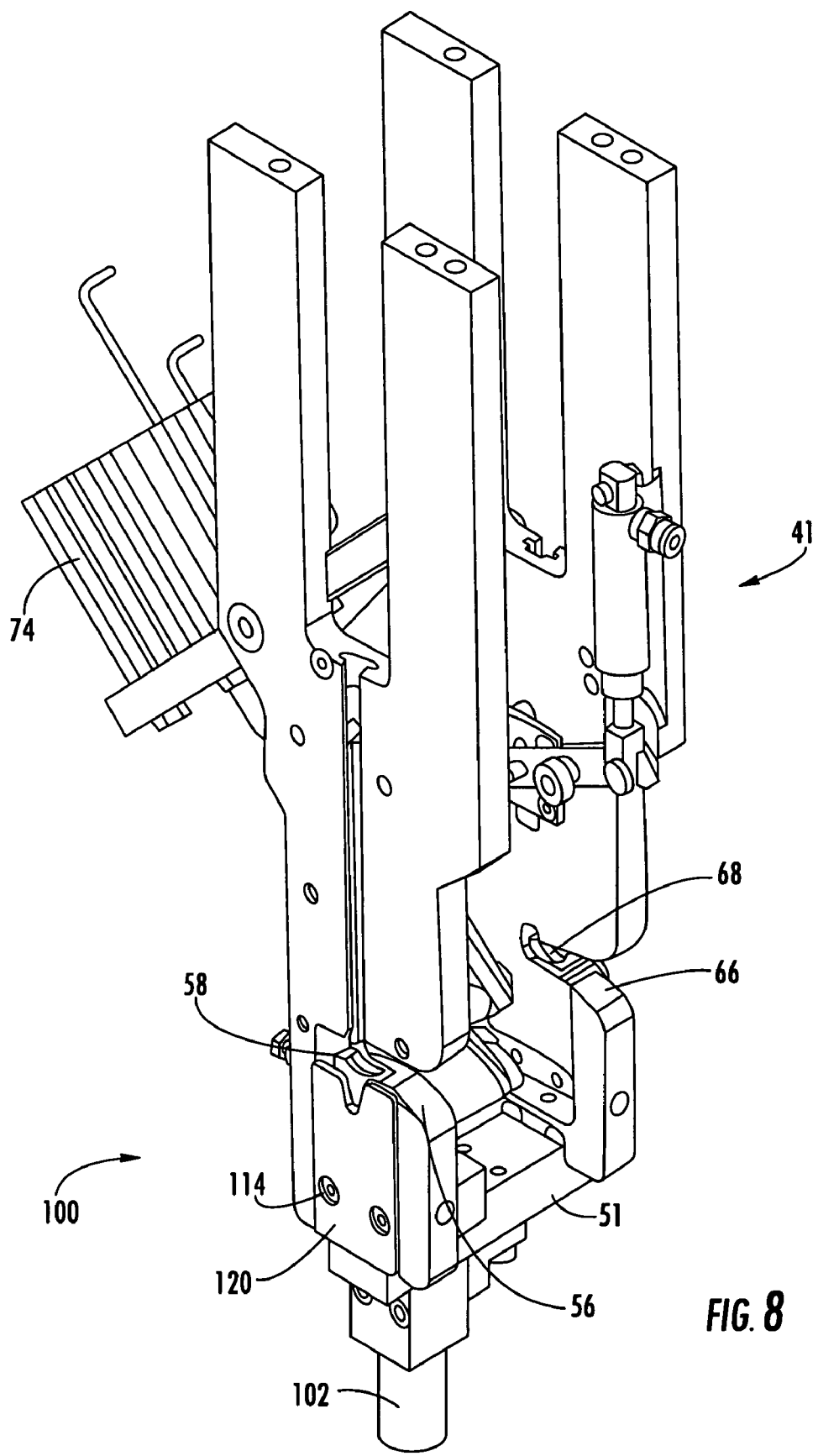
FIG. 8 is a perspective view of a clipper lower subassembly and the retaining mechanism of FIG. 7.

As shown in FIGS. 5, 6 and 7, the clipper 40 can be pivotably mounted to a frame 5 (e.g., by two trunnion type arms as shown) and sized and configured to automatically and controllably actuate (via a force actuator such as a pneumatic or hydraulic cylinder 42) to advance into a clipping position after the product is in position downstream thereof, then clip the covering material, and then retract to await to clip the next covering material for the next enclosed product. The clipper 40 may operate in response to data from a proximity sensor that is positioned to detect when a product is ready for clipping and provide the data to a controller or processor. The proximity sensor may be positioned at any suitable place to indicate when the product is in position. The proximity sensor can be an optical sensor (infrared, photosensor, or the like), a hall-effect sensor, a magnetic sensor, an inductive sensor, and/or any other suitable sensor.

As best seen in FIG. 7, the clipper 40 has a lower subassembly (FIG. 8) and includes two clipper mechanisms 50, 60. Each clipper mechanism 50, 60 includes a punch 52, 62, respectively, a die support plate 54, 64, respectively, and a common drive 44. The punches 52, 62 are movable up and down in channels 53 (the channel associated with the punch 62 is not visible in the figure), in the die support plates under action of the drive. A yoke or punch support block transfers power from the drive 44 to each punch 52, 62. A gathering slot 56, 66 is formed in each die support plate (accordingly, the die support plates may also be regarded as gathering plates). Each clipper mechanism 50, 60 includes a die or anvil 58, 68 (FIG. 8) disposed in the respective gathering slot 56, 66.

The punches 52, 62 are movable in clip channels 53, and they drive clips downwardly into the dies 58, 68. More particularly, the clips (e.g., U-shaped clips) are automatically supplied to the channels 53 above the dies 58, 68 (FIG. 8) from curvilinear clip rails or channels 46. The punches 52, 62 force the clips C into the dies such that the clips are thereby deformed about the covering material positioned in the gathering slots 56, 66.

The clip rails 46 (FIG. 7) can have a curvilinear configuration with a vertical run which is curved at its lower end so that it gradually merges into a horizontal run to direct clips mounted thereon into windows in the die support plates 54, 64 communicating with the channels 53. The clips are typically arranged in a stack with adjacent clips abutting each other so that the legs of each clip fit around the guide rail with a crown of each clip fitting over the guide rail. The multiple clips may be connected to one another by means of a thin elastomeric film, tape or adhesive (typically along the crown) so that the clips together may slide down the guide rail and around the bend therein between the vertical and horizontal runs of the guide rail. Typically, clips are provided in a coil or on a reel for feeding onto the guide rail. Although illustrated herein as a generally vertical and downwardly directed clip feed, other feed orientations may also be employed.

In certain embodiments, after the product moves by, the clipper 40 is moved into its clipping position (either from a home or pre-clip position) by its actuation cylinder 42 toward the centerline of the travel path of the covering material. The gathering slots 56, 66 are configured such that, as the clipper 40 is rotated into the clipping position, they automatically receive and gather a portion of the covering material R, which may be radially compressed by the voiding mechanism 30, to prepare the covering material R for receiving the clip(s) thereabout. The gathering slots 56, 66 may further radially compress the covering material R.

Pairs of cooperating plates can be positioned across the product travel path to retractably travel toward each other, laterally linearly or substantially orthogonal to the direction of product travel, to gather the covering material therebetween. See co-pending, co-assigned U.S. Provisional Patent Application Ser. No. 60/508,609 for additional description, the contents of which have been incorporated by reference hereinabove. As shown, the gathering slots 56, 66 may be formed in the die support plates 54, 64 of the clipper 40 and the die support plates 54, 64 can be described as clipper gathering plates. In certain embodiments, each gathering plate can be mounted so that in operative position they are horizontally and vertically aligned with the corresponding centerlines of the product chute cavity.

Figure 9:
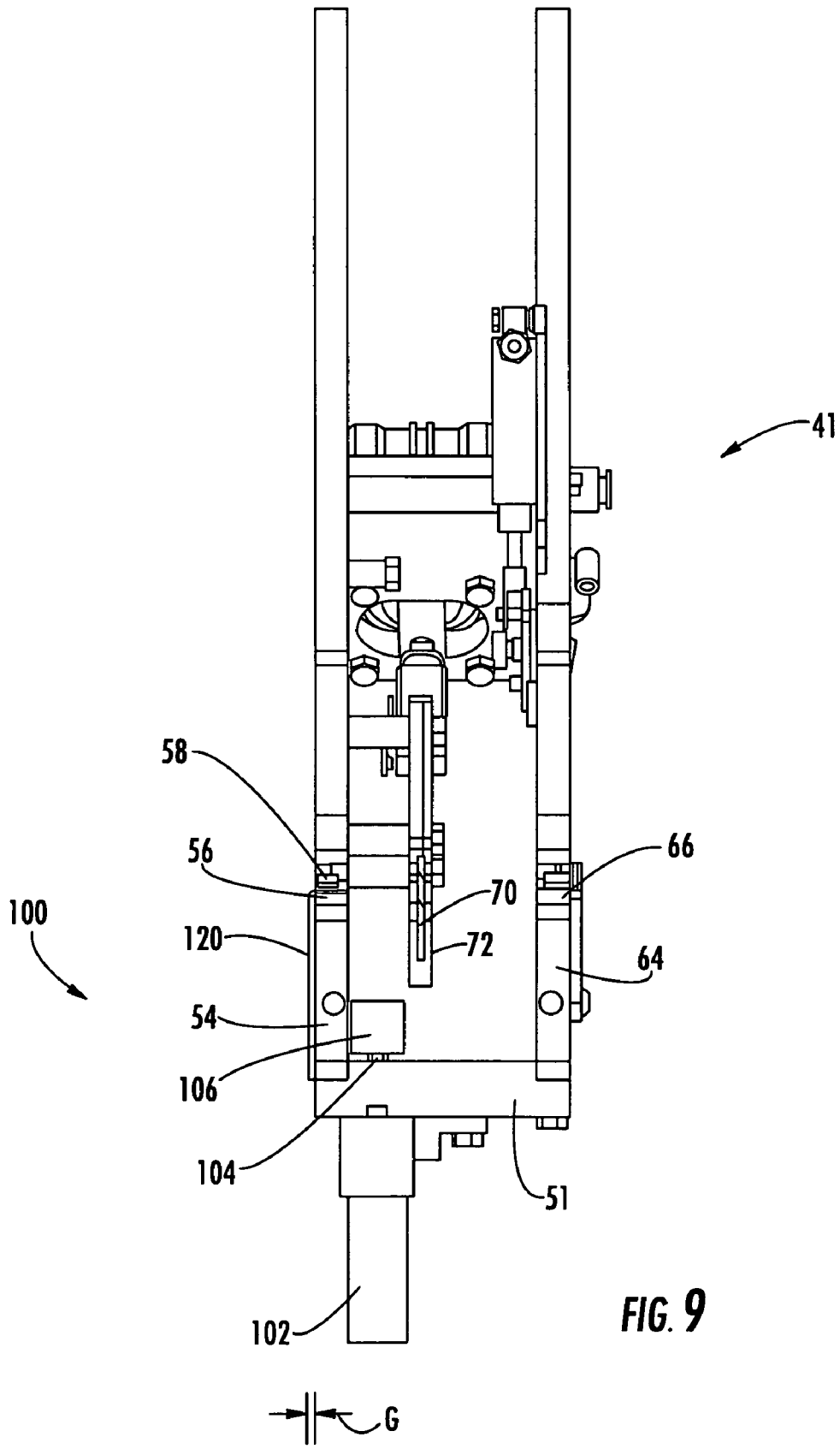
FIG. 9 is a front plan view of the clipper lower subassembly and the retaining mechanism of FIG. 8.
Figure 10:
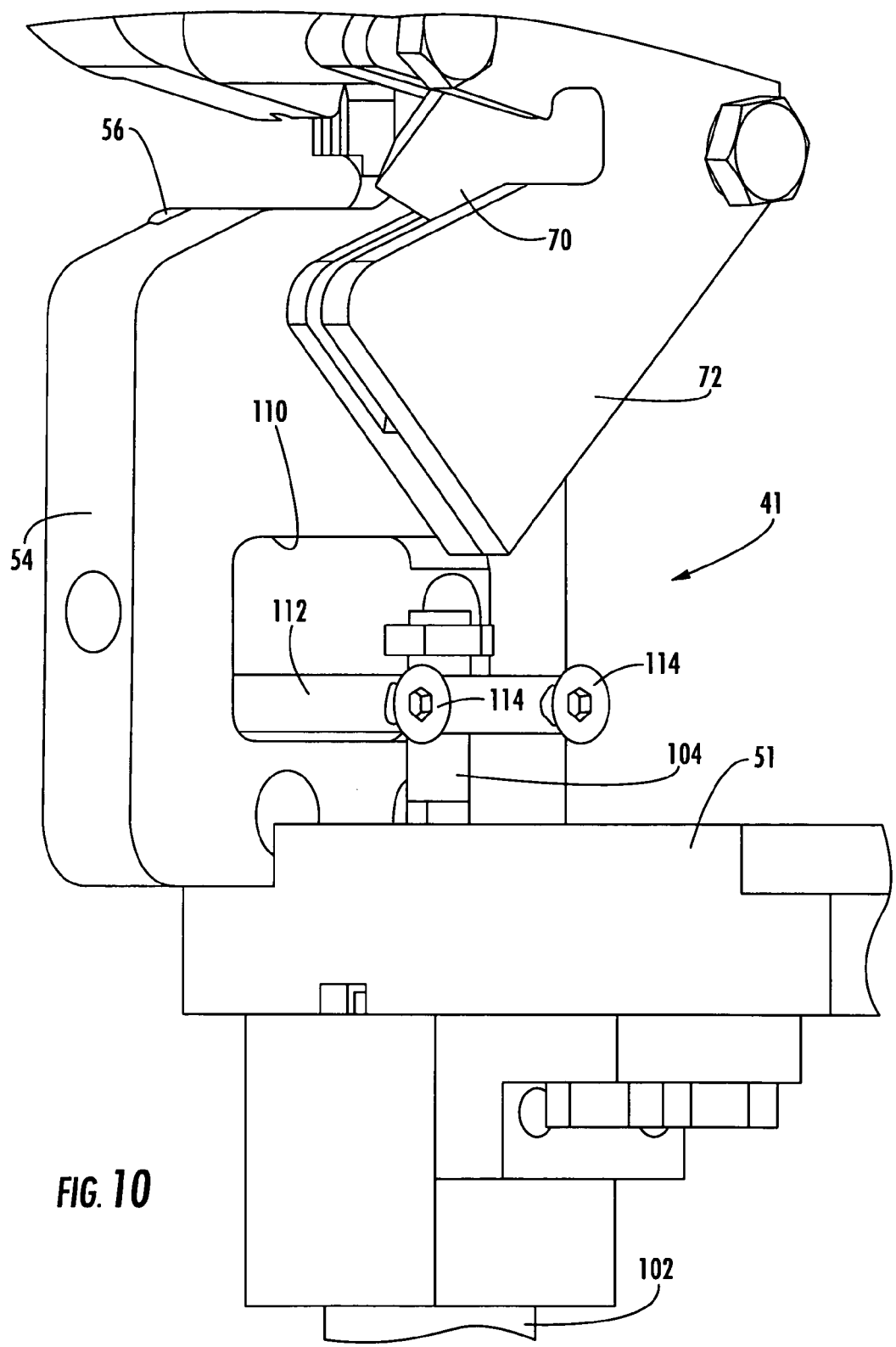
FIG. 10 is a fragmentary, perspective view of the clipper lower subassembly and the retaining mechanism of FIG. 8.

As shown in FIG. 9, the clipper 40 includes a cutting member 70. The cutting member 70 is configured to move in concert with the clipper 40 as the clipper 40 moves to its retracted and clipping positions. An actuator 74 is operative to automatically extend the cutting member into the cutting position and then retract the cutting member. The cutting member 70 resides and slidably travels in a cutting guide 72. The guide 72 is aligned with the gathering slots 56, 66, typically disposed axially intermediate thereof, and may be attached to the clipper 40. In other embodiments, the guide 72 may be formed into a gathering plate (not shown). The cutting member may be a generally planar blade with a leading angled knife-edge portion. Other cutting configurations can be used including, but not limited to, heat (of whatever type), water, pressure, and other knife and/or blade shapes, as well as combinations thereof. Accordingly, the term "cutting" as used herein is used broadly to mean separating and/or severing adjacent portions of covering material and is not limited to physically cutting with a sharp implement. Suitable cutting devices are described in U.S. Pat. Nos. 4,683,700 and 5,161,347, the contents of which are hereby incorporated by reference as if recited in full herein. Also, a bottom-up cutting operation and mechanism can be used.

According to some embodiments and as shown in FIGS. 7-12, the retaining mechanism 100 (or parts thereof) is mounted on the clipper 40. The retaining mechanism 100 includes a die cover plate 120 that is mounted on the clipper 40 and driven by a force actuator 102 (e.g., a hydraulic or pneumatic actuation cylinder). More particularly and with reference to FIG. 10, a guide block 106 is mounted on a shaft 104 of the force actuator 102, which extends through a hole in a cross plate 51. The guide block 106 is coupled to the die cover plate 120 by tie bolts 114 that extend through a guide slot 110 formed through the die support plate 54. The tie bolts 114 extend through an auxiliary block 112 also disposed in the slot 110. The die cover plate 120 slides up and down the die support plate 54 in a guide pocket 116. The die cover plate has a generally V- or U-shaped groove 122 defined in the upper edge thereof and further defining a front leg 124. According to some embodiments, the distance G (FIG. 9) from the downstream face of the leg 124 to the face 48 is no greater than about 0.125 inch. According to some embodiments, the distance G is between about 0.12 and 0.13 inch.

Figure 11:
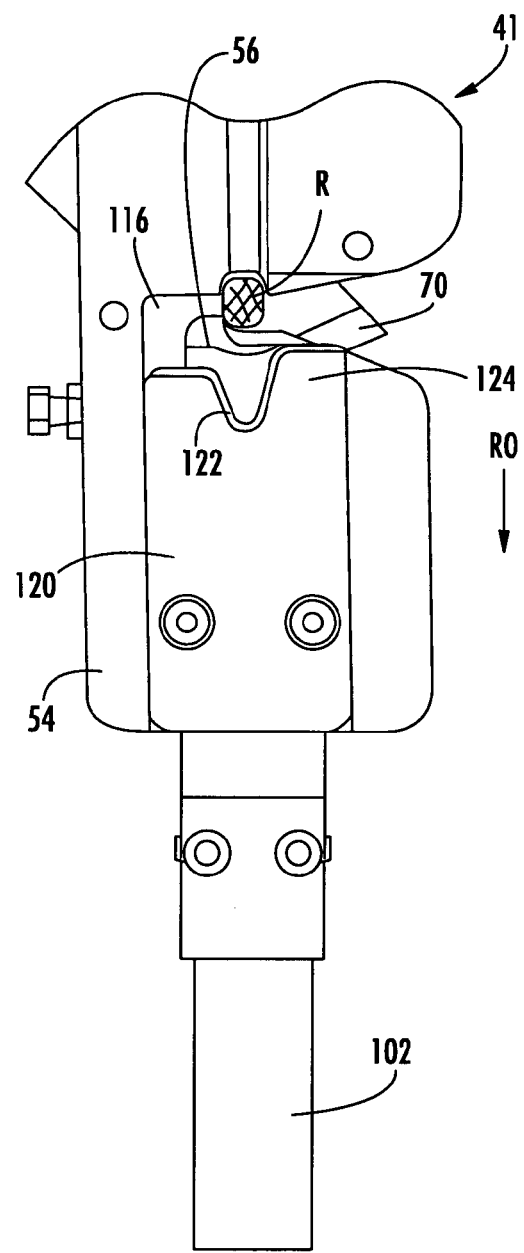
FIG. 11 is a fragmentary, left side elevational view of the clipper lower subassembly and the retaining mechanism of FIG. 8 with a die cover plate of the retaining mechanism in an open position.
Figure 12:
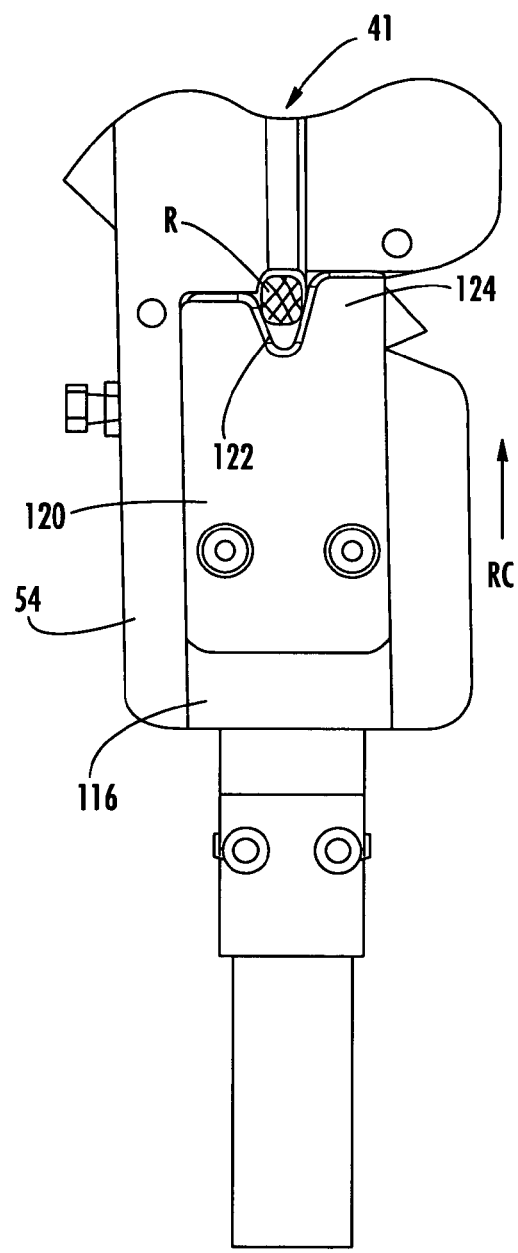
FIG. 12 is a fragmentary, left side elevational view of the clipper lower subassembly and the retaining mechanism of FIG. 8 with the die cover plate in a closed position.

The force actuator 102 is operable to slide or translate the die cover plate 120 in an upward direction RC to a closed position (as shown in FIG. 12) and in a downward direction RO to an open position (as shown in FIG. 11). When the die cover plate 120 is in the open position, the gathering slot 56 is open so that the compressed cord R can slide into the gathering slot 56 without undue interference with the die cover plate 120. When the die cover plate 120 is in the closed position, the front leg 124 effectively closes the gathering slot 56 so that the compressed covering material or rope R cannot be withdrawn through the opening of the gathering slot 56. According to some embodiments, the front leg 124 extends the full height of the slot 56 as illustrated. According to alternative embodiments, the front leg 124 does not fully close the gathering slot 56.

According to some embodiments, when the die cover plate 120 is in the closed position, it engages the compressed covering material R but does not prevent sliding of the covering material R through the slot 122 generally along the axis A-A. That is, the covering material R may still be drawn or pulled through the slot 122 generally along the axis A-A; however, the retaining mechanism 100 may be configured to provide some frictional resistance.

The force actuator 102 can be automatically operated. According to some embodiments, the force actuator 102 is operated automatically in an appropriate sequence with the voiding mechanism 30, the clipper 40, the tensioning mechanism 150 and any related mechanisms as discussed below.

Figure 13:
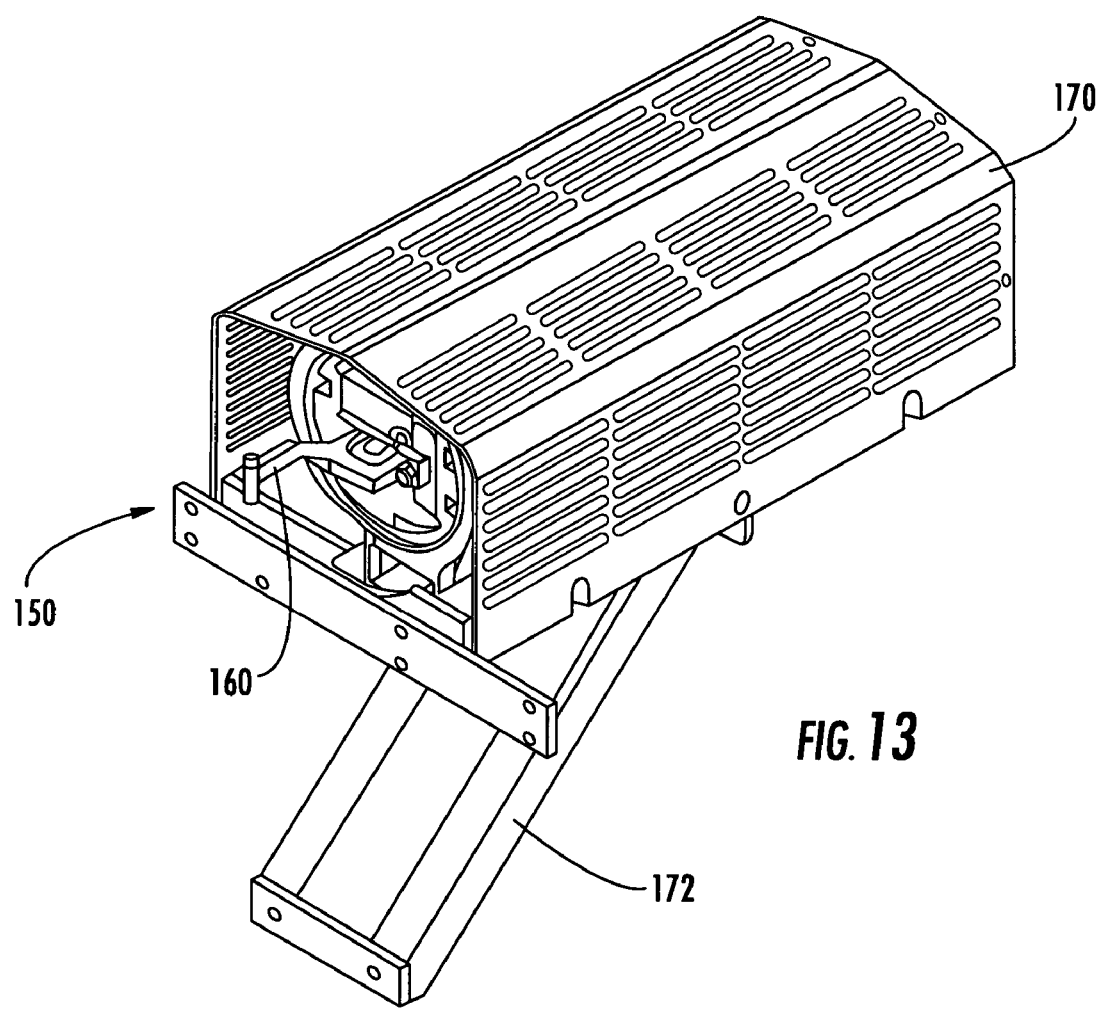
FIG. 13 is a front perspective view of the tensioning mechanism of the apparatus of FIG. 1 including a cover and a mounting frame.
Figure 14:
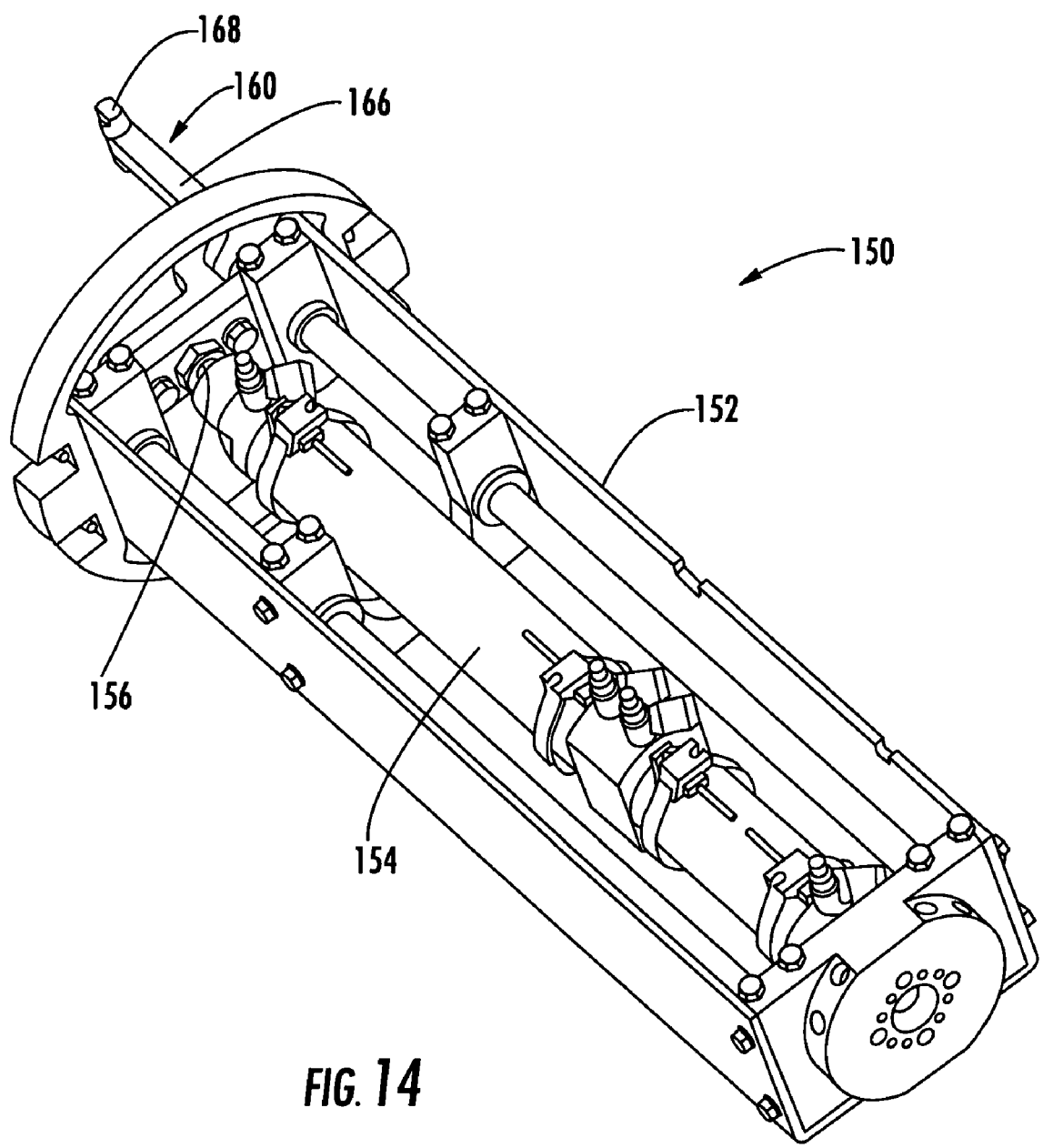
FIG. 14 is a rear perspective view of the tensioning mechanism of FIG. 13 with the cover and the mounting frame removed.
Figure 15:
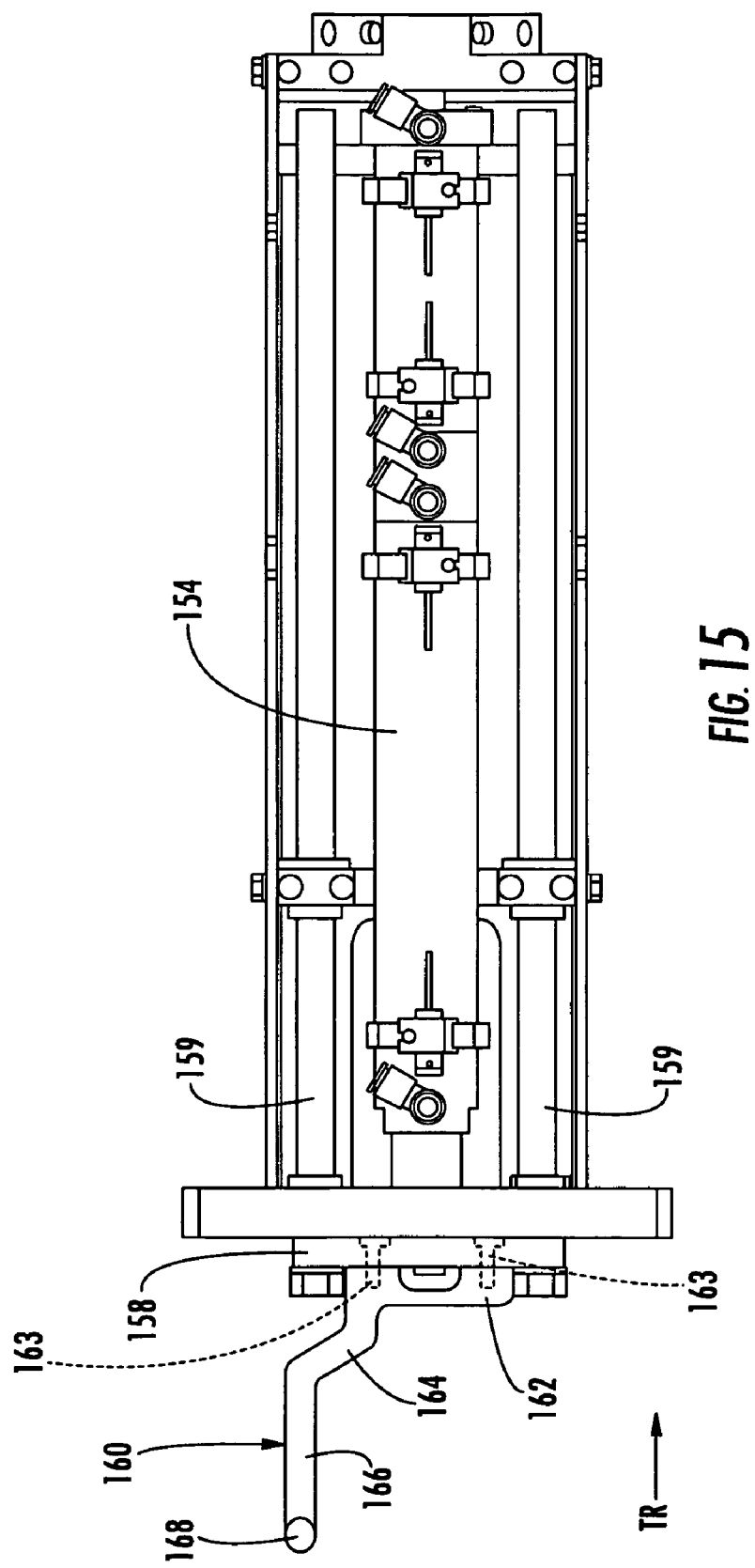
FIG. 15 is a top plan view of the tensioning mechanism of FIG. 14.

With references to FIGS. 1-6 and 13-22, the tensioning mechanism 150 is located downstream of the voiding mechanism 30 (see, e.g., FIGS. 2 and 16). As best seen in FIGS. 13-15, the tensioning mechanism 150 includes a housing 152 and a force actuator 154 (e.g., a hydraulic or pneumatic actuation cylinder) disposed in the housing 152. A head block 158 is secured to a shaft 156 of the force actuator 154. The head block 158 is also coupled to the housing 152 by slidable guide rods 159.

As best seen in FIG. 15, an engagement arm 160 is secured to the head block 158 (e.g., by welding, adhesive, nuts, bolts, and/or the guide rods 159) by bolts 163 for movement therewith. The engagement arm 160 includes a base 162, a sidewardly extending offset leg 164, and an extension leg 166. A vertical leg 168 is mounted on the distal end of the extension leg 166. The engagement arm 160 may be integrally formed.

The tensioning mechanism 150 may be partially or fully shrouded by one or more covers 170 as shown in FIG. 13. The tensioning mechanism 150 may be mounted on the frame 5 using a subframe 172.

Figure 22:
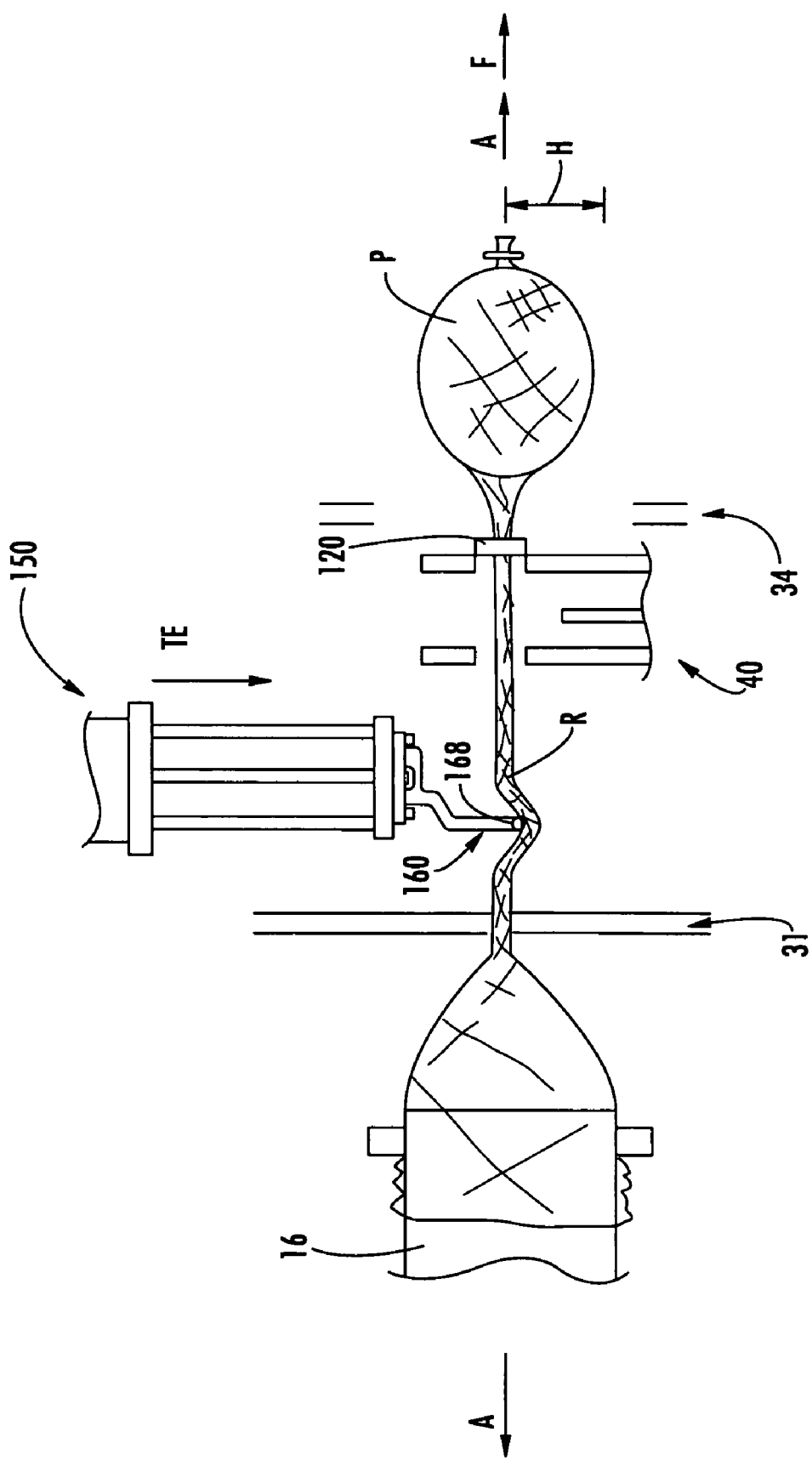

The force actuator 154 is operable to linearly extend the engagement arm 160 in an extending direction TE to an extended position (as shown in FIGS. 6 and 22) transverse to the axis A-A and to retract the engagement arm 160 in a retraction direction TR to a retracted position (as shown in FIGS. 5 and 16). The force actuator 154 may be automatically controlled.

Figure 23:
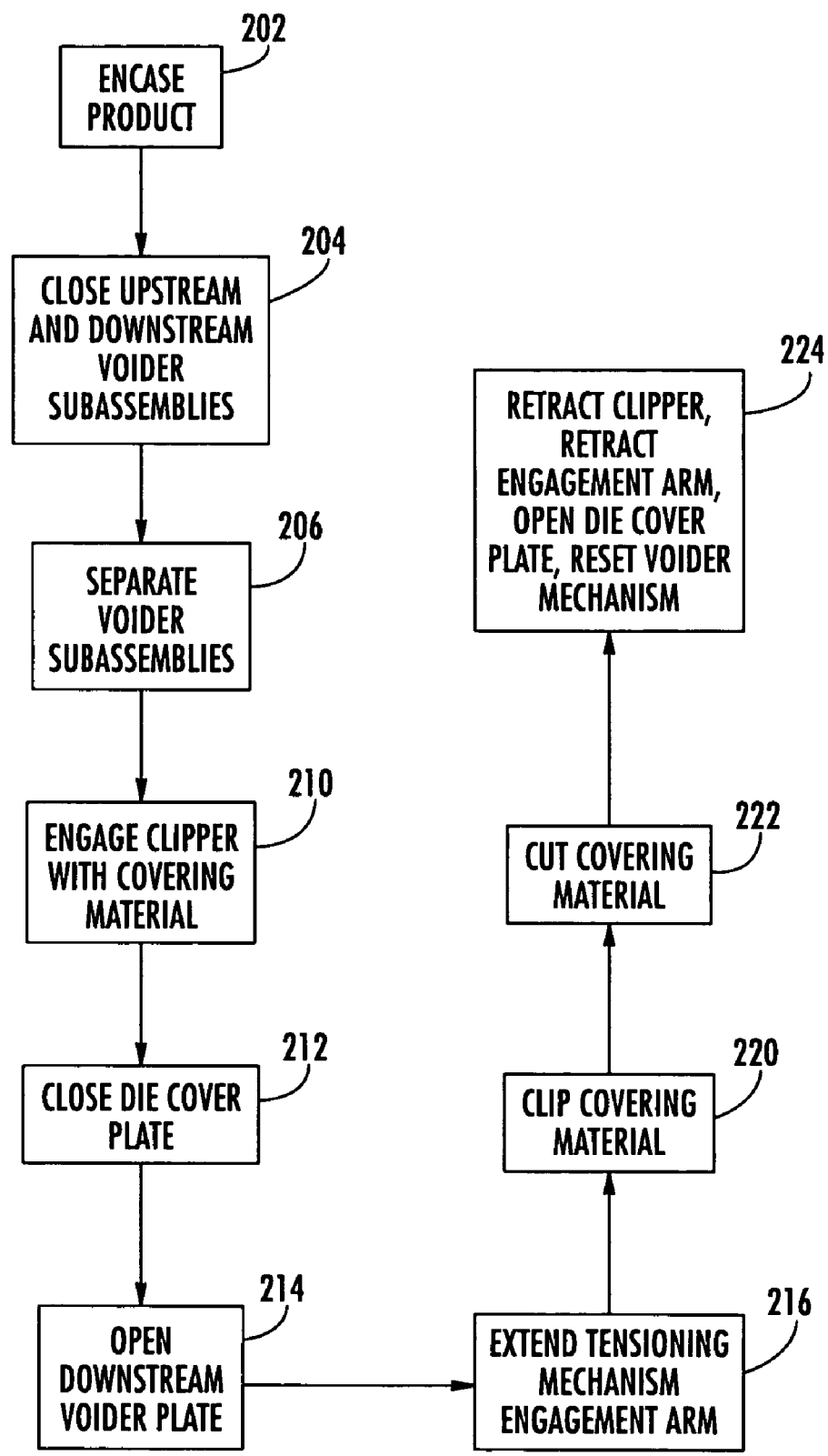
FIG. 23 is a flowchart illustrating methods according to embodiments of the present invention.

According to some embodiments and with reference to FIGS. 16-23, a packaged product assembly can be formed in the following manner using the apparatus 10, for example. With reference to FIG. 16 and as discussed above, the product P is introduced into and passed through the chute 16. Upon exiting the chute 16 at the discharge end of 16B, the product P is encased in the covering material N (Block 202; FIG. 23). At this time, the voiding mechanism 30 is configured with the voider subassemblies 31, 34 together and both open.

Thereafter, the voider subassemblies 31, 34 are each closed on the covering material N as shown in FIG. 17 (Block 204). The voider subassembly 34 is then translated (as indicated by the arrows in FIG. 18) to the shuttled position as shown in FIG. 18 (Block 206). In this way, the voider subassembly 34 forms a radially compressed trailing section R of the covering material N extending generally from the voider subassembly 31 to the voider subassembly 34. The product P may be moved to the tray 24 or other desired location by the voider subassembly 34 or by other means. The voiding mechanism 30 may be activated by a sensor (e.g., a proximity sensor) that detects entry of the product P into the tray 24 or another region. The proximity sensor can be an optical sensor (infrared, photosensor, or the like), a hall-effect sensor, a magnetic sensor, an inductive sensor, and/or any other suitable sensor. The subsequent operations described below may be automatically initiated in appropriate sequence and/or may be controlled by one or more additional sensors.

With reference to FIG. 19, the clipper 40 is then pivoted into the clipping or operational position as shown in FIGS. 4, 6 and 19 so that the compressed covering material R is received in the gathering slots 56, 66 (Block 210). At this time, the die cover plate 120 and the engagement arm 160 are in their open and retracted positions as shown in FIGS. 5, 11 and 19.

Figure 20:
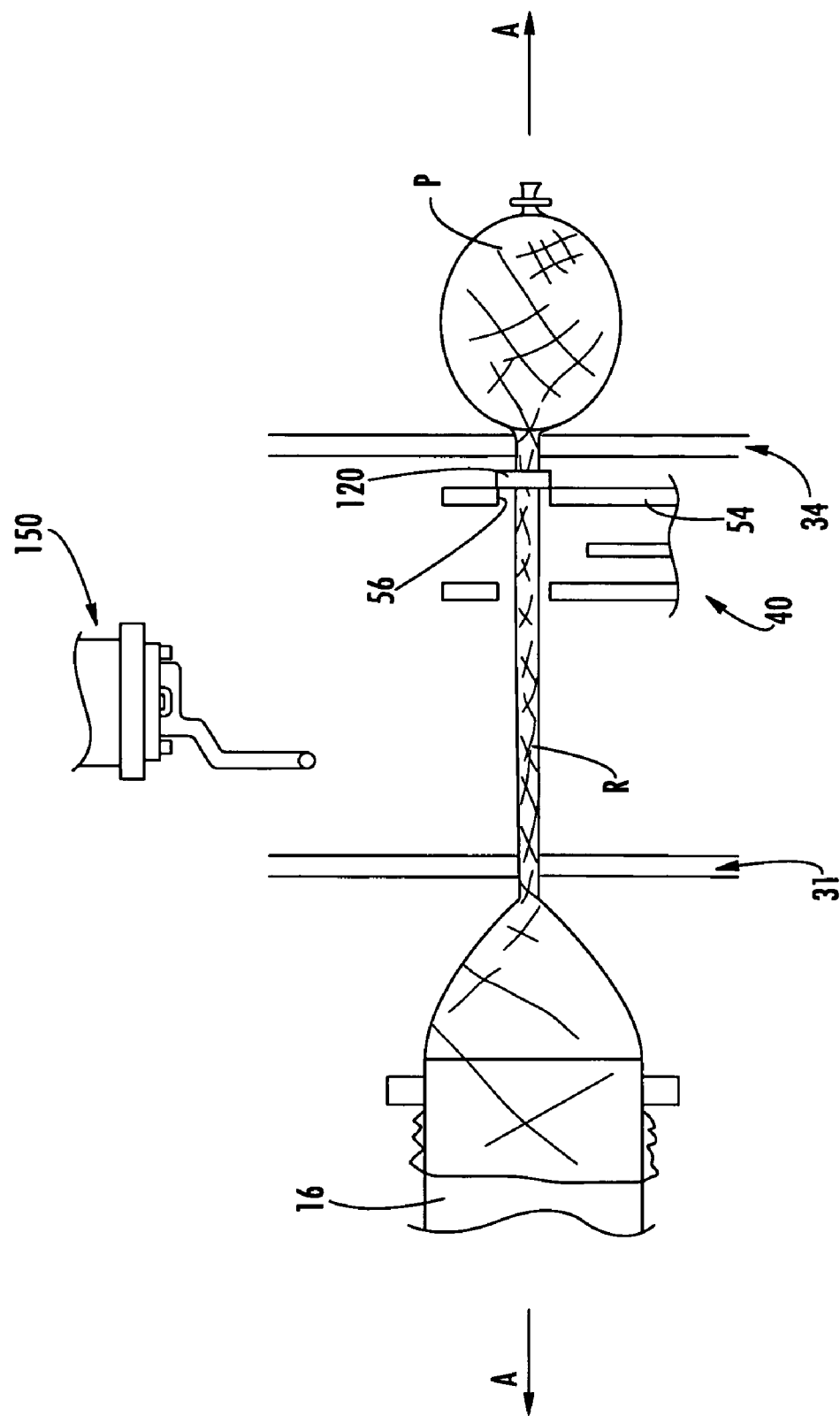

Thereafter, the force actuator 102 is actuated to move the die cover plate 120 into its closed position as shown in FIGS. 12 and 20 (Block 212). In this manner, the rope R is captured in the gathering slot 56 so that it can move axially through the slot but not radially out of the slot 56.

Figure 21:
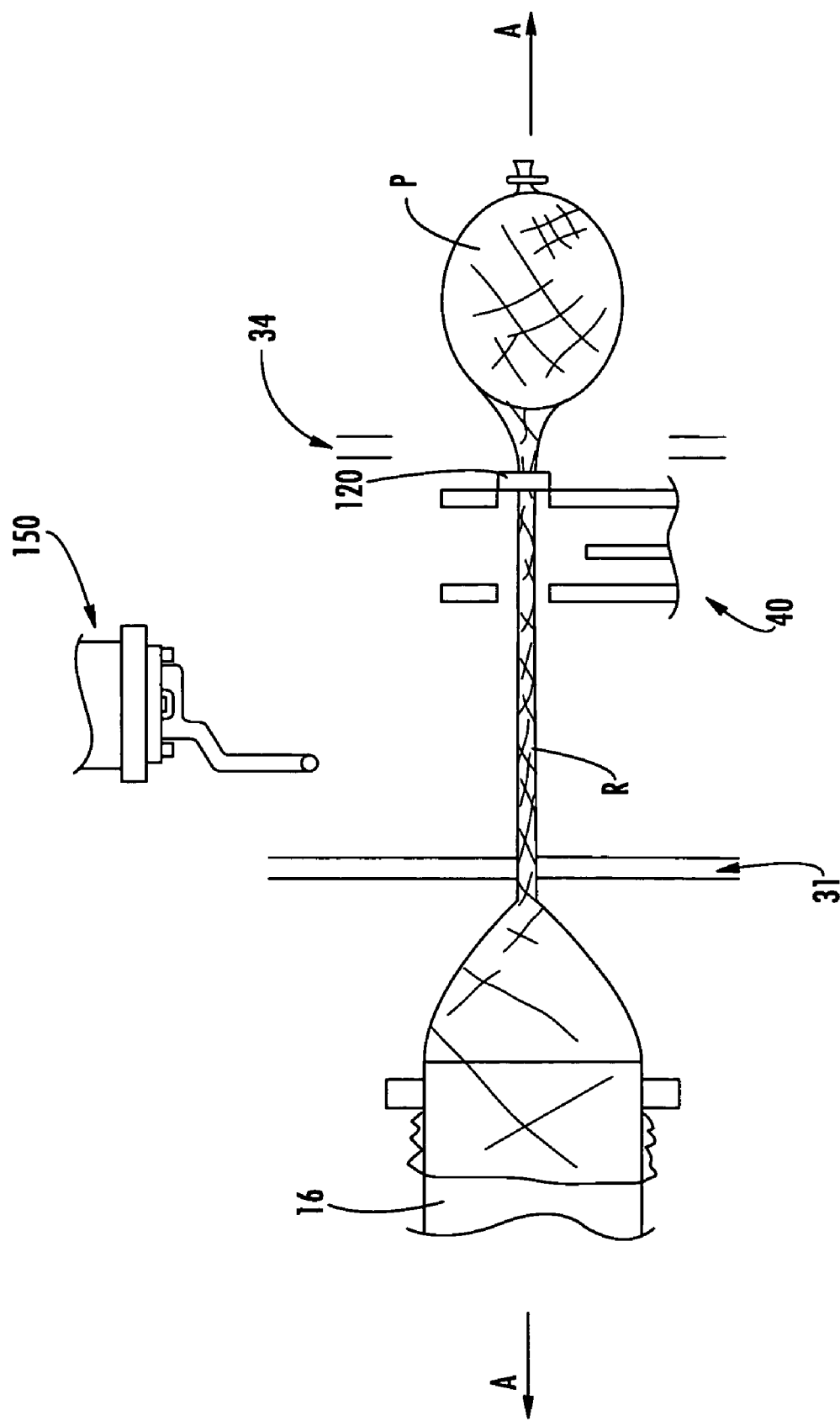

Referring to FIG. 21, the voider subassembly 34 is then transitioned to its open position (Block 214).

With reference to FIG. 22, the force actuator 154 is thereafter actuated to move the engagement arm 160 in the extension direction TE to its extended position as shown in FIGS. 6 and 22 (Block 216). In doing so, the vertical leg 168 engages the compressed covering material R and forces or displaces the covering material R in the direction TE and generally transversely (e.g., perpendicularly) to the axis A-A and the flow path direction F or the center line of the compressed covering material R. This displacement is resisted by the grip of the voider subassembly 31 and/or the brakes 20 on the covering material N. As a result, the tensioning mechanism 150 applies or introduces a new or additional tensioning load via the engagement arm 160 on the compressed covering material R that tends to draw or pull the covering material N that is downstream of the engagement arm 160 upstream, causing the covering material N downstream of the die support plate 54 to be drawn inwardly (i.e., upstream) through the slot 56. According to some embodiments, the product P is drawn into abutment and loaded against the die cover plate 120 so that the covering material N is drawn more tightly about the product P and the distance between the die 58 and the product P is reduced. The die cover plate 120 inhibits the compressed covering material R from pulling or popping out of the gathering slot 56, but allows the material R to slide through and generally parallel to the axis A-A and the flow path direction F.

With the covering material N and the product P in this condition, the clipper 40 is actuated to apply the clips to the parts of the compressed covering material R in the gathering slots 56, 66 adjacent the dies 58, 68 (Block 220).

Thereafter, the cutting member 70 cuts between the gathering slots 56, 66 (Block 222).

The force actuator 154 then retracts the engagement arm 160 and the force actuator 102 retracts the die cover plate 120. The clipper 40 and the voiding mechanism 30 are likewise returned to their initial home positions (Block 224).

As will be appreciated from the foregoing description, the apparatus and methods may serve to tighten the fit of the cover W about the product P by drawing covering material back upstream (i.e., along the axis A-A and counter to the flow direction). In particular, a portion or length of the covering material N may be drawn upstream through the clipper 40 so that the amount of covering material between the die 58 (and thus, the new clip) and the earlier installed clip is reduced.

Also, by opening the voider subassembly 34 and allowing the product to abut the die cover plate 120, the apparatus and methods position the product P closer to the die 58 at the time of applying the clip. This will also allow a tighter and more conforming or less voluminous cover W. This may be particularly beneficial in the case where the tension that can be applied to the covering material before clipping is limited, for example, by the tensile strength of the covering material. It is further contemplated that the apparatus may be arranged so that the product P abuts some other structure. For example, a further structure (e.g., a plate) may be inserted downstream of the die support plate 54 to abut the product P, such further structure being configured and positioned so as to reduce the distance between the product P and the die 58 as compared to the voiding mechanism 30. Alternatively or additionally, the die cover plate 120 may be relocated, for example, to the inside of the die support plate 54. It may be preferred, however, to provide the die cover plate or other abutment structure between the product P and the gathering slot 56 in order to prevent or minimize entry of a portion of the product P into the gathering slot 56 where it may interfere with the die 58 and the punch 52. According to some embodiments, the voider subassembly 34 remains in the closed position during the tensioning and clipping steps. If provided, a force actuated product holder on the downstream side of the clipper 40 (e.g., formed as part of the tray 24) may engage and push the product upstream toward the clipper 40.

According to some embodiments, the tensioning system applies an additional tension load of at least 15 psi to the rope R. According to some embodiments, the tensioning system applies an additional tensioning load of at least 30 psi to the rope R. According to some embodiments, the tensioning system applies an additional tensioning load of between about 15 and 30 psi to the rope R.

According to some embodiments, the tensioning mechanism 150 displaces the rope R a distance H (FIG. 22) perpendicular to the axis A-A of at least 0.5 inch. According to some embodiments, the distance H is at least 2 inches. According to some embodiments, the distance H is between about 0.5 and 2 inches.

According to some embodiments, the tensioning system draws at least 0.5 inch of the rope R axially back upstream through the gathering slot 56 and past the die 58. According to some embodiments, the tensioning system draws at least 4 inches of the rope R axially back upstream through the gathering slot 56 and past the die 58. According to some embodiments, the tensioning system draws between about 0.5 and 4 inches of the rope R axially back upstream through the gathering slot 56 and past the die 58.

Figure 24:
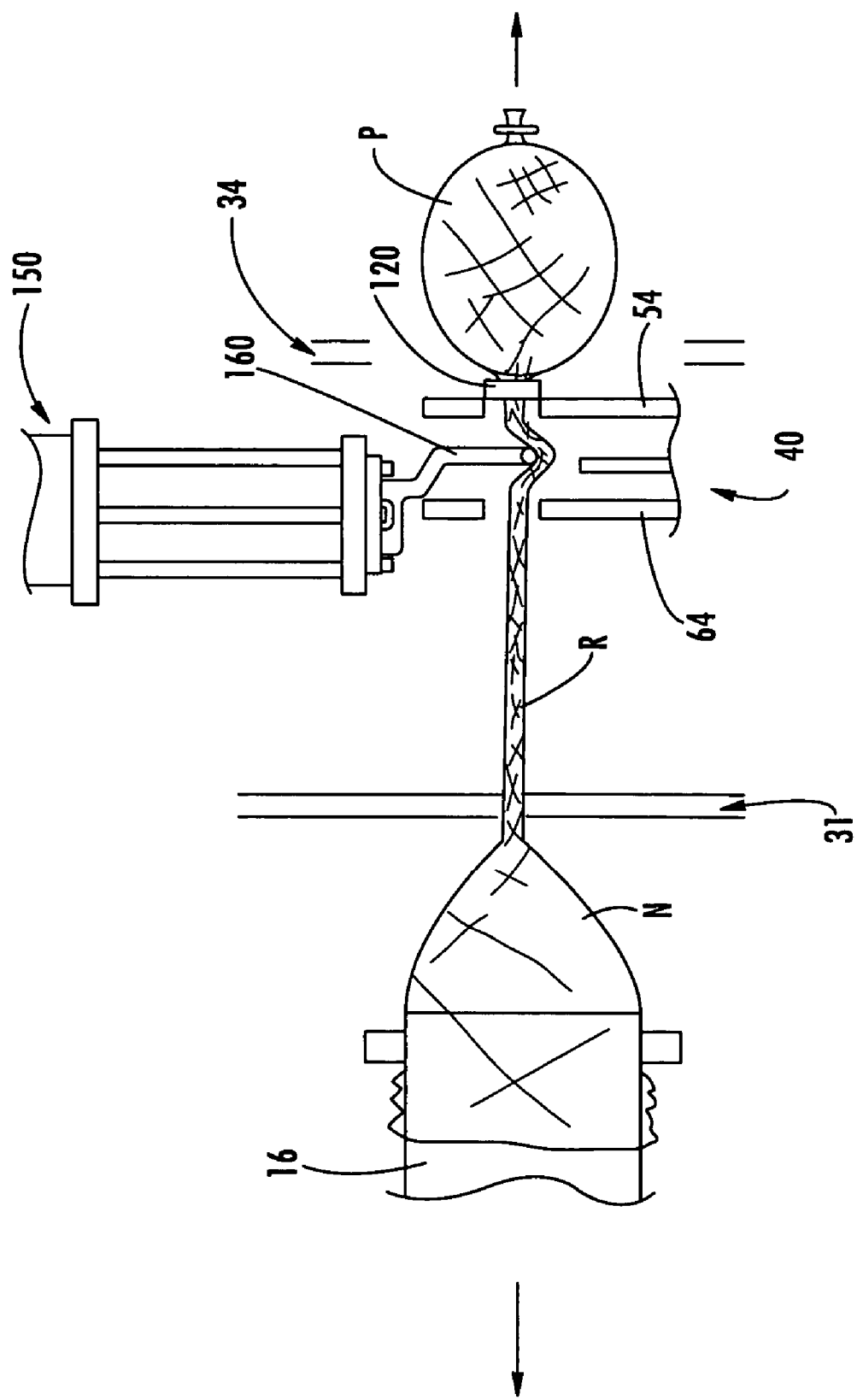
FIG. 24 is a schematic view illustrating further method embodiments in accordance with the present invention.

According to certain alternative embodiments of the present invention and as illustrated in FIG. 24, the apparatus 10 may be reconfigured such that the engagement arm 160 engages the compressed covering material R between the die support plates 54 and 64. The apparatus and method may otherwise correspond to the apparatus and method as described with reference to FIGS. 16-23.

Figure 25:
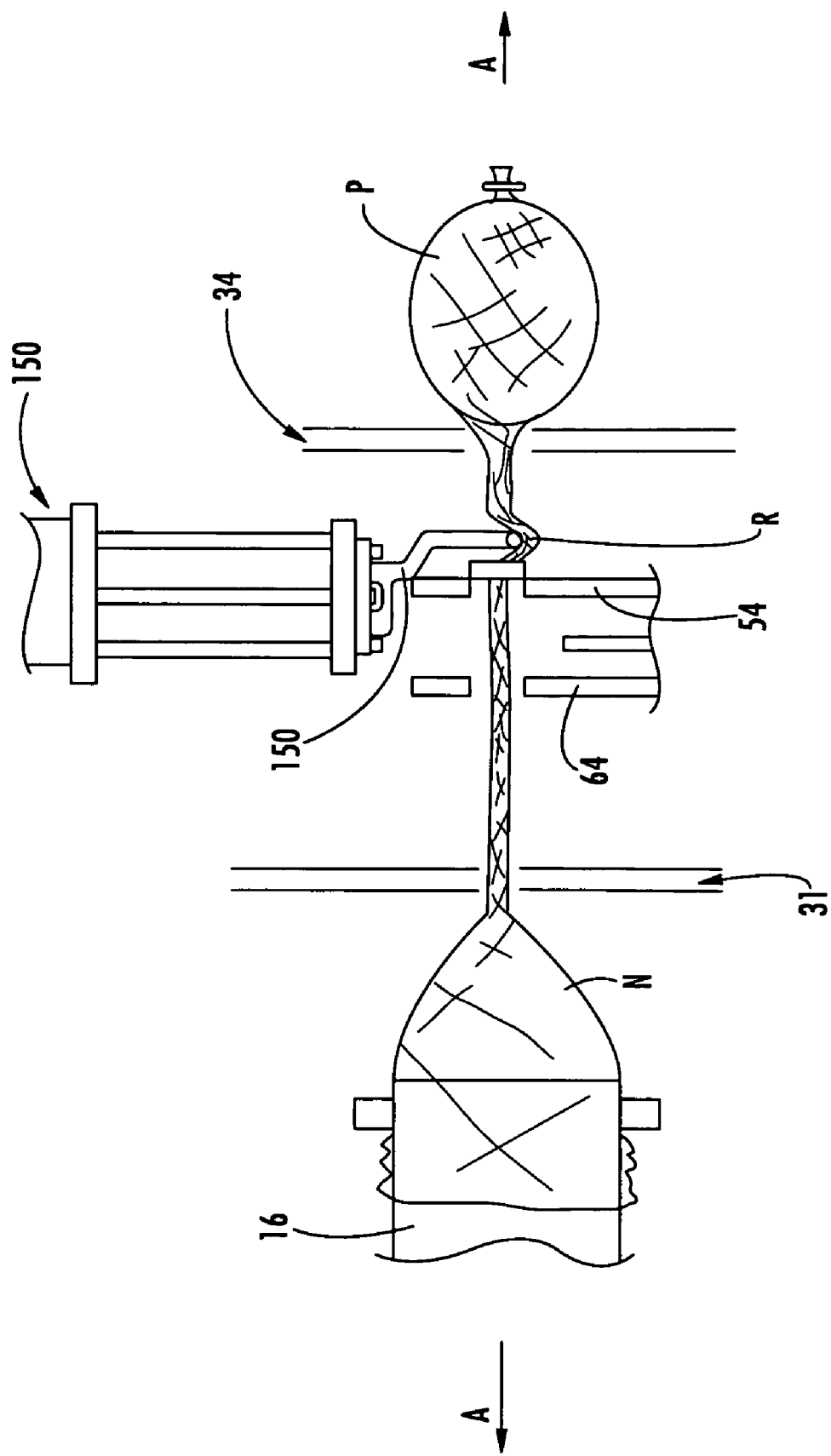
FIG. 25 is a schematic view illustrating further method embodiments in accordance with the present invention.

According to still further embodiments of the present invention and as illustrated in FIG. 25, the apparatus 10 may be reconfigured such that the engagement arm 160 engages the compressed covering material R between the die support plate 54 and the downstream voider subassembly 34. In this case, the voider subassembly 34 is maintained in the closed position rather than being opened as discussed above with respect to FIG. 21. The apparatus and method may otherwise correspond to the apparatus and method described above with reference to FIGS. 16-23 except that the product P abuts with the downstream voider subassembly 34 rather than the die cover plate 120. Rather than tightening the covering material about the product, the foregoing configuration and method may be employed to ensure that a prescribed or additional volume is provided in the cover W. In particular, this apparatus and method may be used to ensure a measured or precise amount of extra volume is provided in the cover W. For this purpose, the grip on the covering material on the upstream end may be relaxed to allow the covering material to be pulled downstream by the extension of the engagement arm 160.

According to some embodiments, some tension may be present in the compressed covering material R prior to actuation of the tensioning mechanism 150. In particular, a pusher, the brake 20 and/or the voiding mechanism 30 may generate tension in the material R. Typically, this tension will be present prior to engagement of the clipper 40 with the rope R (i.e., prior to receipt of the rope R into the gathering slots 56, 66), and the tensioning mechanism 150 will serve to introduce an additional tensioning load.

While the tensioning mechanism 150 as described above extends and retracts sidewardly with respect to the axis A-A and the flow path, the apparatus 10 may be reconfigured such that the engagement arm 160 extends transversely to the flow path from above or below the flow path.

Figure 26:
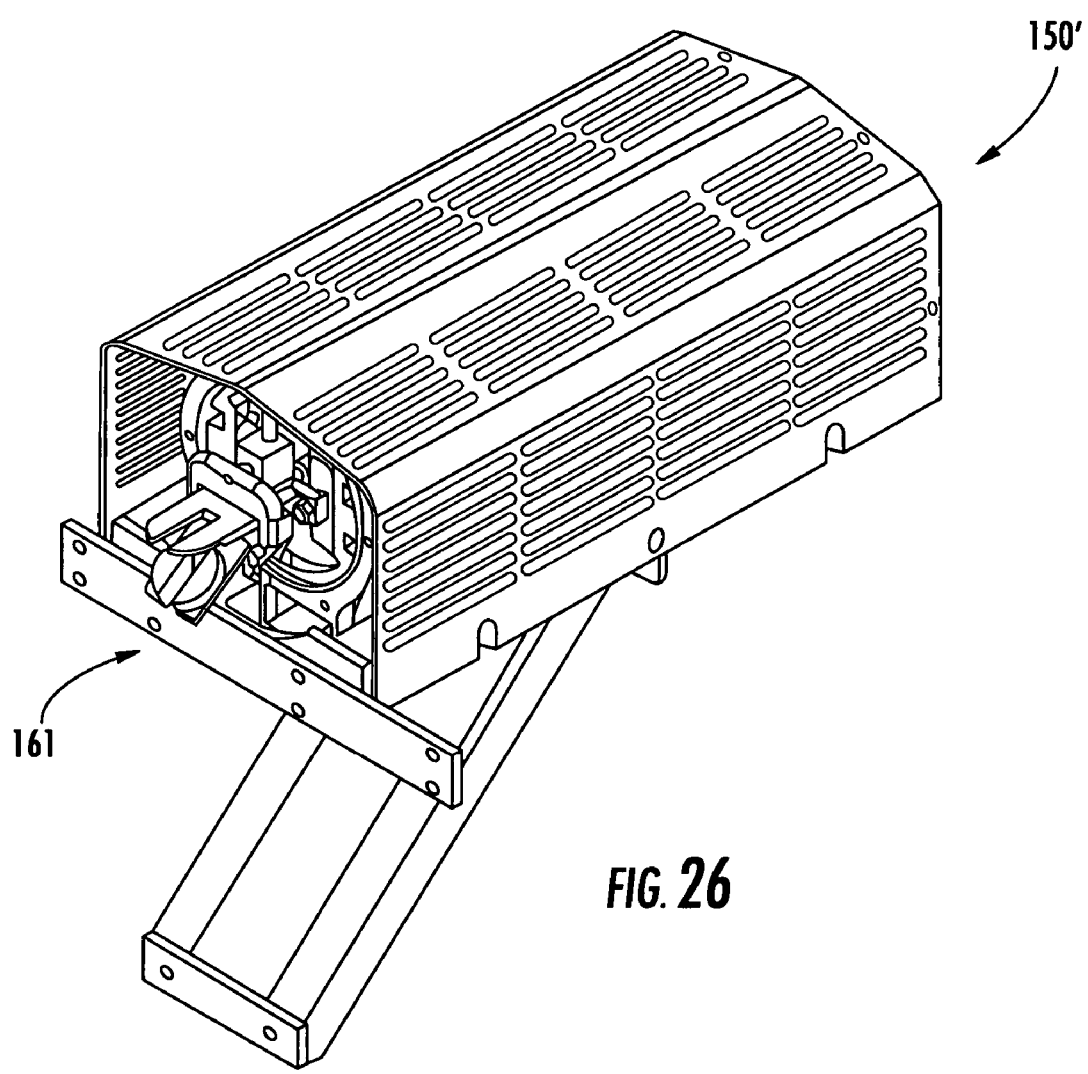
FIG. 26 is a front perspective view of a handle making mechanism in accordance with embodiments of the present invention.

According to some embodiments, the engagement arm 160 may be removable from the head block 154 and replaceable with a handle maker attachment 161 to form a handle maker mechanism 150' as shown in FIG. 26. For example, in the illustrated embodiment, this may be accomplished by removing the engagement arm 160 from the head block 158 and bolting the handle maker attachment 161 to the head block 158 in its place. An example of a suitable handle maker attachment will be apparent from the disclosure of U.S. Pat. No. 6,739,102 to Ailey, Jr. et al, the contents of which are hereby incorporated by reference as if recited in full herein. Such interchangeability between the engagement arm 160 and the handle maker 161 may be particularly advantageous in that it may allow for improved versatility, enhanced cost effectiveness and reduced set-up requirements.

In some embodiments, the apparatus 10 includes a product-holding member (i.e., product clamp) that can automatically be moved into position by actuating a clamp drive cylinder and thereby block the product from moving further downstream. The holding member can hold the encased product so that the upstream covering material is relatively firmly or tightly held proximate the clipper 40 and/or facilitate centering the covering material during the gathering and clipping operations. Co-pending, co-assigned U.S. Provisional Application Ser. No. 60/579,709 identified by describes a flap configuration that can be used to hold the product and co-pending, co-assigned U.S. Provisional Application Ser. No. 60/508,609 describes a clamp bar, the contents of which are hereby incorporated by reference as if recited in full herein. Thus, other discharge tables or product holding members may be used in lieu of and/or with the tray 24. The actuation of the holding member can be controlled by the PLC using proximity sensors and operation feedback as will be understood by one of skill in the art.

The frame 5 can have pre-formed apertures, brackets, or other structures or members that can allow the clipper 40 and/or tensioning mechanism 150 to mount to the desired side of the frame 5 without customizing the frame for a particular customer. The frame 5 and the clipper 40 and/or tensioning mechanism 150 can be modular to be able to provide several build options so as to be assembled to the desired side of the frame during manufacturing assembly to meet a customer's order without customizing each component for each customer. This will allow a decrease in labor, less single-purpose inventory, and/or faster build cycles.

The operation and sequence of certain events can be controlled by a programmable logic controller. Certain operations may be selected by an operator input using a Human Machine Interface to communicate with the controller as is well known to those of skill in the art. An automated cycle can be manually initiated or automatically initiated by a sensor detecting a condition such as a product at a prescribed location. The apparatus 10 can automatically (i.e., typically via the PLC) proceed to initiate each of the operations described above.

Figure 27:
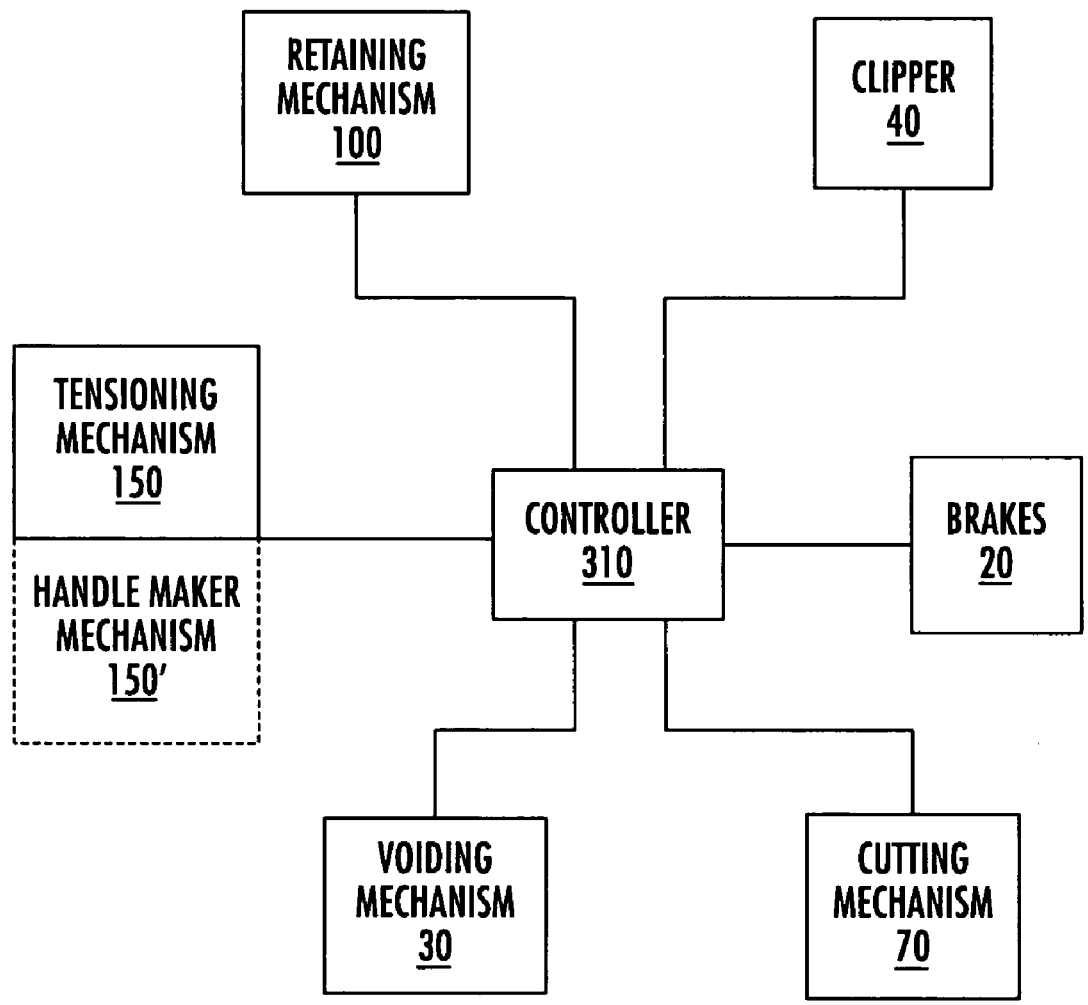
FIG. 27 is a block diagram illustrating a control configuration according to embodiments of the present invention.

With reference to FIG. 27, a control system according to embodiments of the present invention for enabling and executing the operations and methods described above is shown therein. A controller 310, which may be a single or multiple associated or intervening controllers, is operatively connected to various components of the apparatus. The controller is thereby able to actuate the various mechanisms to conduct the steps described above. More particularly, the controller may be operative to control: 1) the tensioning mechanism 150 (e.g., the extension and retraction of the force actuator 150); 2) the retaining mechanism (e.g., the extension and retraction of the force actuator 102); 3) the voiding mechanism 30 (e.g., the opening and closing of each voider subassembly as well as the transitioning between the together and shuttled positions); 4) the covering material brake 20 (e.g., the pressure applied to the chute 16); 5) the clipper 40 (e.g., the extension and retraction of the clipper 40 by the force actuator 42 and the firing of the punches by the drive 44); and 6) the cutting mechanism 70 (e.g., the actuation of the force actuator 74). The controller 310 may also be capable of operating in a first mode that controls the force actuator 154 in a manner appropriate for the operation of the tensioning system and the tensioning mechanism 150 as described above and, alternatively, in a second mode that controls the force actuator 154 (and any additional associated force actuators or other components) in a suitable manner for forming a handle in the covering material using the handle maker mechanism 150' (FIG. 26). While the first mode may involve only the reciprocal motion of the engagement member, the second mode may include reciprocal, clamping and rotational movements as described in U.S. Pat.

No. 6,739,102 to Ailey, Jr. et al. Accordingly, it will be appreciated that apparatus in accordance with the present invention, including tensioning systems and retaining systems in accordance with the present invention, may include one or more controllers that are adapted to operate the described components in the manners described and claimed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. An apparatus for enclosing a product in a covering material the apparatus comprising:
   a) a product feed and covering system configured to apply the covering material over the product;
   b) a clipper mechanism defining a slot and disposed downstream of the product feed and covering system along a flow path of the covering material, the clipper mechanism being configured to receive the covering material in the slot and to secure a clip to the covering material received in the slot, the clipper mechanism being rotatable relative to the flow path between a first position, wherein the clipper head is distal from the flow path, and a second position, wherein the clipper head is proximate the flow path; and
   c) a tensioning system including a tensioning mechanism configured to draw a portion of the covering material along the flow path while the covering material is received in the clipper mechanism to introduce a tensioning load to the covering material while the covering material is received in the clipper mechanism;
   d) wherein the apparatus is operative to rotate the clipper mechanism relative to the flow path onto the covering material to collect and receive the covering material in the slot, to thereafter operate the tensioning mechanism to draw a portion of the covering material along the flow path to introduce a tensioning load to the covering material while the covering material is received in the slot, and to thereafter operate the clipper mechanism to apply a clip to the covering material while the covering material is received in the slot.

2. The apparatus of claim 1 wherein the tensioning system is configured to maintain the tensioning load in the covering material while the clipper mechanism is securing the clip to the covering material.

3. The apparatus of claim 1 wherein the tensioning system is configured to draw the portion of the covering material upstream along the flow path through the clipper mechanism while the covering material is received in the clipper mechanism.

4. The apparatus of claim 1 wherein the tensioning system is configured to draw the portion of the covering material downstream along the flow path through the clipper mechanism while the covering material is received in the clipper mechanism.

5. The apparatus of claim 1 wherein the tensioning mechanism is operative to displace the covering material in a direction generally transverse to the flow path to introduce the tensioning load.

6. The apparatus of claim 5 wherein the tensioning mechanism includes an engagement member and is operative to selectively move the engagement member to engage the covering material and displace the covering material in the direction transverse to the flow path to introduce the tensioning load.

7. The apparatus of claim 6 wherein the clipper mechanism is configured to secure the clip to the covering material at a clipping location and the engagement member is configured to engage and displace the covering material upstream of the clipping location.

8. The apparatus of claim 6 wherein the clipper mechanism is configured to secure the clip to the covering material at a clipping location and the engagement member is configured to engage and displace the covering material downstream of the clipping location.

9. The apparatus of claim 6 wherein:
   the clipper mechanism is configured to secure the clip to the covering material at a first clipping location and to secure a second clip to the covering material at a second clipping location spaced apart from the first clipping location along the flow path; and
   the engagement member is configured to engage and displace the covering material between the first and second clipping locations.

10. The apparatus of claim 6 wherein the tensioning mechanism includes a force actuator coupled to the engagement member and operative to selectively move the engagement member to engage and displace the covering material.

11. The apparatus of claim 10 wherein the engagement member is removably and replaceably coupled to the force actuator.

12. The apparatus of claim 5 including a frame, wherein the clipper mechanism is mounted on the frame and the tensioning mechanism is modularly removably and replaceably mounted on the frame.

13. The apparatus of claim 1 including a retaining mechanism operable to retain the covering material in the clipper mechanism.

14. The apparatus of claim 13 wherein the retaining mechanism is operable to permit movement of the covering material relative to the clipper mechanism along the flow path while limiting displacement of the covering material in a direction transverse to the flow path.

15. The apparatus of claim 13 wherein the retaining mechanism is attached to and movable with the clipper mechanism relative to the flow path.

16. The apparatus of claim 13 wherein:
   the clipper mechanism includes a gathering slot configured to gather the covering material; and
   the retaining mechanism includes a retainer member and is operable to selectively close at least a portion of the gathering slot with the retainer member.

17. The apparatus of claim 16 wherein the retaining mechanism includes a force actuator coupled to the retainer member and operable to selectively move the retainer member to open and close the gathering slot.

18. The apparatus of claim 16 wherein the retainer member is disposed downstream of the gathering slot.

19. The apparatus of claim 13 further including a voiding mechanism configured to gather and compress the covering material downstream of the clipper mechanism and the retaining mechanism into a rope.

20. The apparatus of claim 1 wherein the clipper mechanism is configured to secure the clip to the covering material at a clipping location, and wherein the clipper mechanism includes a cutting mechanism mounted thereon and configured to sever the covering material upstream of the clipping location.

21. The apparatus of claim 1 wherein the product feed and covering system includes a chute to direct the product into the covering material.

22. The apparatus of claim 1 including a covering material brake configured to control the supply of the covering material along the flow path.

23. The apparatus of claim 1 wherein the tensioning system is in communication with a controller.

24. The apparatus of claim 1 further comprising a retaining mechanism including a retainer member and a force actuator coupled to the retainer member and operable to selectively move the retainer member to open and close the slot with the retainer member, wherein the apparatus is operative to operate the force actuator to close the slot with the retainer member to capture the covering material in the slot, to thereafter operate the tensioning mechanism to draw a portion of the covering material along the flow path to introduce the tensioning load to the covering material while the covering material is captured in the slot and the slot is closed by the retainer member, and to thereafter operate the clipper mechanism to apply the clip to the covering material while the covering material is captured in the slot and the slot is closed by the retainer member.

25. The apparatus of claim 1 wherein the flow path extends substantially horizontally.

26. An apparatus for enclosing a product in a covering material, the apparatus comprising:
    a) a product feed and covering system configured to apply the covering material over the product;
    b) a clipper mechanism defining a slot and disposed downstream of the product feed and covering system along a flow path of the covering material, the clipper mechanism being configured to receive the covering material in the slot and to secure a clip to the covering material received in the slot, the clipper mechanism being rotatable relative to the flow path between a first position, wherein the clipper head is distal from the flow path, and a second position, wherein the clipper head is proximate the flow path;
    c) a tensioning system including a tensioning mechanism configured to draw a portion of the covering material along the flow path while the covering material is received in the clipper mechanism to introduce a tensioning load to the covering material while the covering material is received in the clipper mechanism; and
    d) a retaining mechanism including a retainer member and a force actuator coupled to the retainer member and operable to selectively move the retainer member to open and close the slot with the retainer member;
    e) wherein the apparatus is operative to operate the force actuator to close the slot with the retainer member to capture the covering material in the slot, to thereafter operate the tensioning mechanism to draw a portion of the covering material along the flow path to introduce a tensioning load to the covering material while the covering material is captured in the slot and the slot is closed by the retainer member, and to thereafter operate the clipper mechanism to apply a clip to the covering material while the covering material is captured in the slot and the slot is closed by the retainer member.

27. An apparatus for enclosing a product in a covering material, the apparatus comprising:
    a) a product feed and covering system configured to apply the covering material over the product;
    b) a clipper mechanism defining a slot and disposed downstream of the product feed and covering system along a flow path of the covering material, the clipper mechanism being configured to receive the covering material in the slot and and to secure a clip to the covering material received in the slot, the clipper mechanism being rotatable relative to the flow path between a first position, wherein the clipper head is distal from the flow path, and a second position, wherein the clipper head is proximate the flow path; and
    c) a tensioning system configured to introduce a tensioning load to the covering material after and while the covering material is received in the clipper mechanism;
    d) wherein the tensioning system is configured to draw the portion of the covering material downstream along the flow path through the clipper mechanism while the covering material is received in the clipper mechanism.

28. An apparatus for enclosing a product in a covering material, the apparatus comprising:
    a) a product feed and covering system configured to apply the covering material over the product;
    b) a clipper mechanism defining a slot and disposed downstream of the product feed and covering system along a flow path of the covering material, the clipper mechanism being configured to receive the covering material in the slot and to secure a clip to the covering material received in the slot, the clipper mechanism being rotatable relative to the flow path between a first position, wherein the clipper head is distal from the flow path, and a second position, wherein the clipper head is proximate the flow path; and
    c) a tensioning system configured to introduce a tensioning load to the covering material after and while the covering material is received in the clipper mechanism;
    d) wherein the tensioning system includes a tensioning mechanism, the tensioning mechanism including an engagement member and operative to selectively move the engagement member to engage the covering material and displace the covering material in the direction transverse to the flow path to introduce the tensioning load; and
    e) wherein the clipper mechanism is configured to secure the clip to the covering material at a clipping location and the engagement member is configured to engage and displace the covering material downstream of the clipping location.

29. An apparatus for enclosing a product in a covering material, the apparatus comprising:
    a) a product feed and covering system configured to apply the covering material over the product;
    b) a clipper mechanism defining a slot and disposed downstream of the product feed and covering system along a flow path of the covering material, the clipper mechanism being configured to receive the covering material in the slot and to secure a clip to the covering material received in the slot, the clipper mechanism being rotatable relative to the flow path between a first position, wherein the clipper head is distal from the flow path, and a second position, wherein the clipper head is proximate the flow path; and
c) a tensioning system configured to introduce a tensioning load to the covering material after and while the covering material is received in the clipper mechanism;
d) wherein:
  the clipper mechanism is configured to secure the clip to the covering material at a first clipping location and to secure a second clip to the covering material at a second clipping location; and
  the engagement member is configured to engage and displace the covering material between the first and second clipping locations.

* * * * *